US011907215B2

(12) United States Patent
Chong et al.

(10) Patent No.: US 11,907,215 B2
(45) Date of Patent: Feb. 20, 2024

(54) STAGED QUERY COMPILATION WITH COMMON DATA STRUCTURE

(71) Applicant: SAP SE, Walldorf (DE)

(72) Inventors: Jaehyok Chong, Seoul (KR); Won Jun Chang, Seoul (KR); Sungguk Lim, Seoul (KR); Youngbin Bok, Seoul (KR); Heesik Shin, Seoul (KR); Kijoong Kim, Hanam (KR)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 17/469,576

(22) Filed: Sep. 8, 2021

(65) Prior Publication Data

US 2023/0074090 A1 Mar. 9, 2023

(51) Int. Cl.
*G06F 16/2453* (2019.01)

(52) U.S. Cl.
CPC .............. *G06F 16/24542* (2019.01)

(58) Field of Classification Search
None
See application file for complete search history.

(56) References Cited

U.S. PATENT DOCUMENTS

| 7,984,043 B1* | 7/2011 | Waas ................. G06F 16/8358 707/718 |
| 8,793,243 B2 | 7/2014 | Weyerhaeuser et al. |
| 9,229,978 B2 | 1/2016 | Weyerhaeuser et al. |
| 9,477,724 B2 | 10/2016 | Song et al. |
| 9,633,075 B2 | 4/2017 | Song et al. |
| 9,734,180 B1* | 8/2017 | Graham ............ G06F 16/24542 |
| 10,324,929 B2 | 6/2019 | Qi et al. |
| 10,503,734 B2 | 12/2019 | Scheibli et al. |
| 2009/0106189 A1 | 4/2009 | Jain et al. |
| 2009/0106214 A1* | 4/2009 | Jain ................... G06F 16/24568 |
| 2010/0005077 A1 | 1/2010 | Krishnamurthy et al. |

(Continued)

OTHER PUBLICATIONS

Red Hat Customer Portal, "Chapter 10. Federated Planning", available from https://access.redhat.com/documentation/en-us/red_hat_integration/2020.q1/html/data_virtualization_reference/federated-planning, pp. 1-49 (Jan.-Mar. 2020).

(Continued)

*Primary Examiner* — Christopher J Raab
(74) *Attorney, Agent, or Firm* — Klarquist Sparkman, LLP

(57) ABSTRACT

Methods and apparatus are disclosed for staged query compilation. One or more intermediate plans between a query and its execution plan are stored according to a common specification for plan data structures. Data sources, a plan flow, and annotations can be stored in respective fields of the plan data structure, which can be extended with a field for a serialized execution plan. Plan data structures provide a stable interface for integration of local and external software modules, and decouple plan representation from plan optimization. Use cases are disclosed for integrating offline optimization with inline software modules, for integrating local query handling with external services, for caching intermediate plans, and for archiving plans across version changes of optimizers. A hub architecture flexibly supports numerous compilation workflows. Disclosed technologies are suitable for cloud deployments and for migration of databases into the cloud.

20 Claims, 21 Drawing Sheets

(56) References Cited

U.S. PATENT DOCUMENTS

| | | |
|---|---|---|
| 2016/0253385 A1 | 9/2016 | Thombre et al. |
| 2017/0017689 A1 | 1/2017 | Scheibli et al. |
| 2017/0339203 A1 | 11/2017 | Kekre et al. |
| 2018/0046675 A1* | 2/2018 | Zhou ................. G06F 16/24549 |
| 2019/0104189 A1 | 4/2019 | Horen |
| 2019/0392068 A1 | 12/2019 | Wen et al. |
| 2021/0073226 A1* | 3/2021 | Chavan ............. G06F 16/24537 |
| 2021/0089532 A1 | 3/2021 | Patel et al. |

OTHER PUBLICATIONS

SAP, "SAP HANA Performance Guide for Developoers", available from https://help.sap.com/doc/05b8cb60dfd94c82b86828ee77f7e0d9/2.0.05/en-US/SAP_HANA_Performance_Developer_Guide_en.pdf, pp. 1-280 (Jul. 2021).

SAP, "Performance and Tuning Series: Improvising Performance with Statistical Analysis", available from https://help.sap.com/doc/a613e89cbc2b1014aec1f20fbf3a34ec/16.0.4.1/en-US/SAP_ASE_Performance_Tuning_Improving_Performance_en.pdf, pp. 1-64 (Aug. 2021).

Extended European Search Report, Application No. 22192793.2-1203, dated Feb. 3, 2023, 10 pages.

SAP HANA, "SAP HANA Performance Guide for Developers," downloaded Jan. 1, 2023, from https://help.sap.com/doc/05b8cb60dfd94c82b86828ee77f7e0d9/2.0.04/en-US/SAP_HANA_Performance_Developer_Guide_en.pdf, pp. 1-256 (Oct. 2019).

* cited by examiner

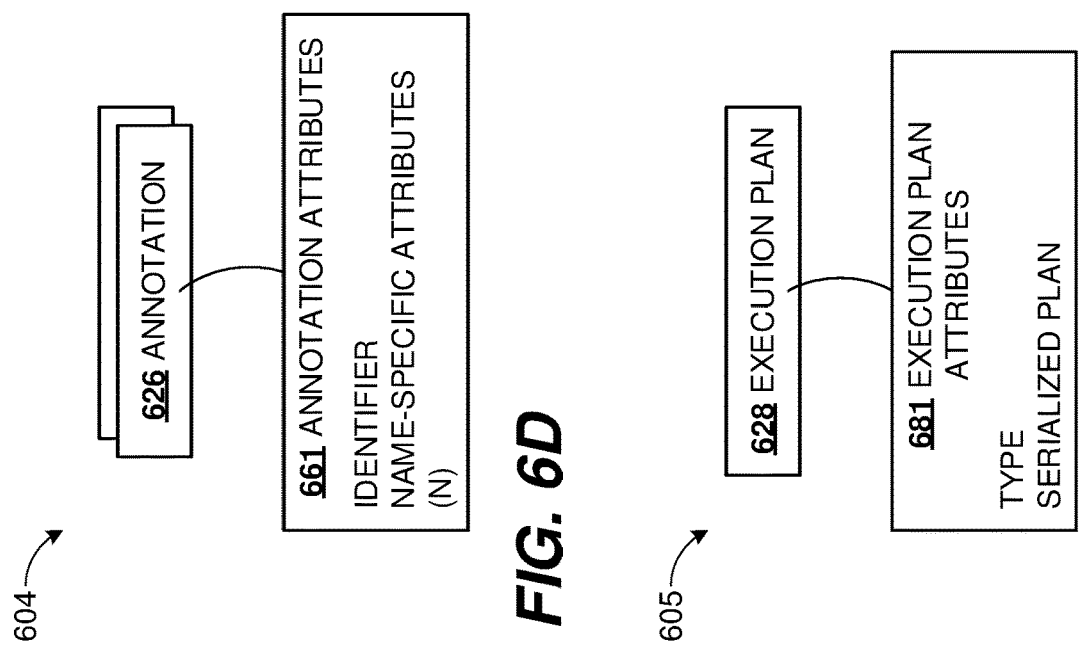
*FIG. 6D*
*FIG. 6E*
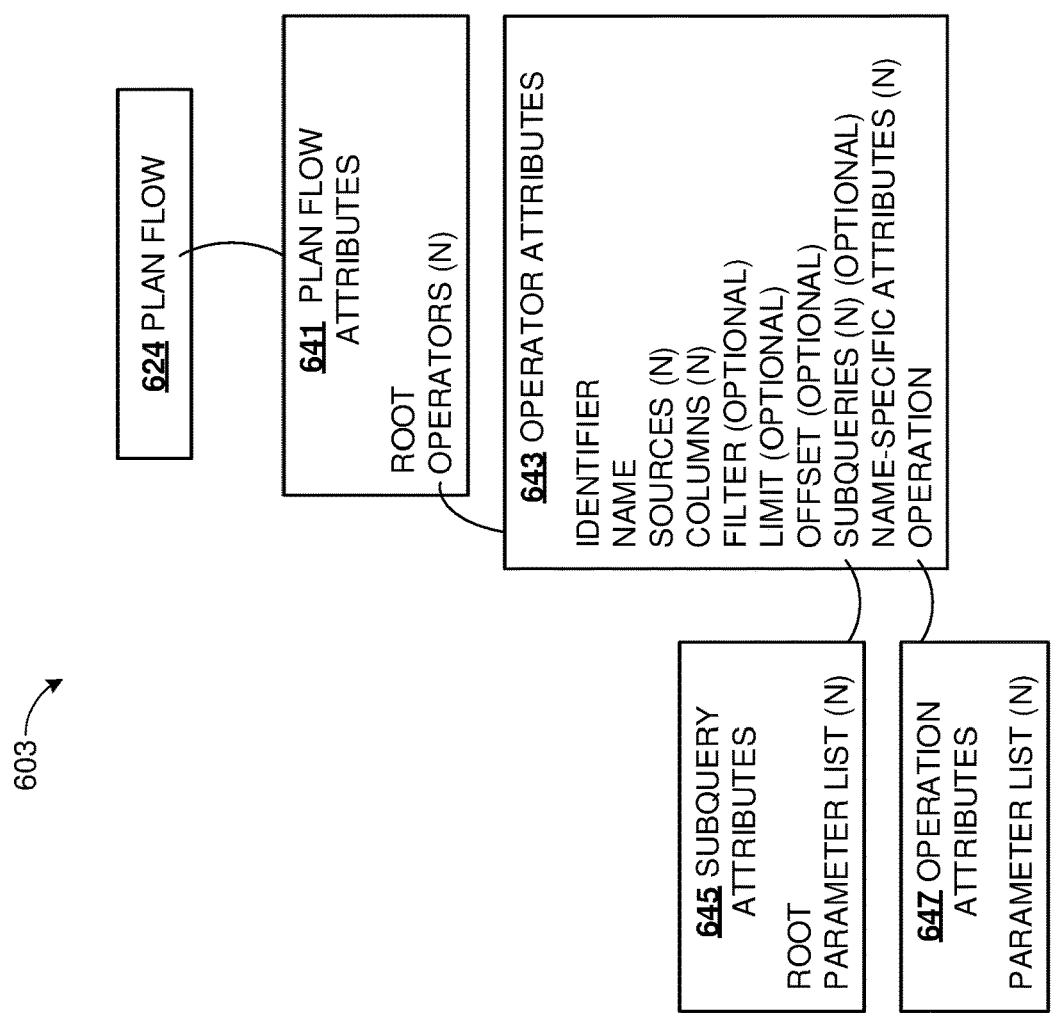
*FIG. 6C*

701

```
                    715 SQL QUERY
SELECT
    l_returnflag,
    l_linestatus,
    SUM(l_quantity) AS sum_qty,
    SUM(l_extendedprice) AS sum_base_price,
    SUM(l_extendedprice * (1 - l_discount)) AS sum_disc_price,
    SUM(l_extendedprice * (1 - l_discount) * (1 + l_tax)) AS
        sum_charge,
    AVG(l_quantity) AS avg_qty,
    AVG(l_extendedprice) AS avg_price,
    AVG(l_discount) AS avg_disc,
    COUNT(*) AS count_order
FROM
    lineitem
WHERE
    l_shipdate <= ADD_DAYS('1998-12-01', -90)
GROUP BY
    l_returnflag,
    l_linestatus
ORDER BY
    l_returnflag,
    l_linestatus
```

```
                        722 DATA SOURCE
"data_source": [
    {
        "id": 1, "database": "PS1", "schema": "SYSTEM",
            "name": "lineitem",
        "type": "ROW TABLE",
        "columns": [
            {
                "name": "l_returnflag",
                "type":"VARCHAR(1)",
                "distinct_count": 3,
                "null_count": 0
            },
            {
                "name": "l_linestatus",
                "type":"VARCHAR(1)",
                "distinct_count": 2,
                "null_count": 0
            },
            { "name": "l_quantity", "type":"DECIMAL(12,2)" },
            { "name": "l_extendedprice", "type":
                "DECIMAL(12,2)" },
            { "name": "l_discount", "type":"DECIMAL(12,2)" },
            {
                "name": "l_tax",
                "type":"DECIMAL(12,2)",
                "nullable": false
            },
            { "name": "l_shipdate", "type":"DATE" }
        ],
        "indexes": [],
        "partitions": [ {"id": 1, "volume": 1 } ],
        "row_count": 6001215
    }
]
```

```
"plan_flow": {
  "operators": [
    {
      "id":2,"Name":"DATA ACCESS", "sources":
[1],
      "columns": [
        "[0][0]", "[0][1]", "[0][2]", "[0][3]",
        "[0][4]", "[0][5]", "[0][6]"
      ],
      "filter": "[0][6] <= add_days('1998-12-
01', -90)"
    },
    {
      "id": 3, "Name": "GROUP BY", "sources":
[2],
      "columns": [
        "[0][0]", "[0][1]", "[][0]", "[][1]",
        "[][2]", "[][3]", "[][4]", "[][5]",
        "[][6]", "[][7]"
      ],
      "operation": [
        { "grouping": ["[0][0]", "[0][1]"] }
        { "aggregation": [
          "SUM( [0][2] )", "SUM( [0][3] )",
          "SUM( [0][3] * (1-[0][4]) )",
          "SUM( [0][3] * (1-[0][4]) *
                (1+[0][5]) )",
          "AVG( [0][2] )", "AVG( [0][3] )",
          "AVG( [0][4] )", "COUNT( * )"
        ]}
      ]
```

724 PLAN FLOW

```
    },
    {
      "id": 4, "Name": "ORDER BY", "sources":
[3],
      "columns": [
        "[0][0]", "[0][1]", "[0][2]", "[0][3]", "[0][4]",
        "[0][5]", "[0][6]", "[0][7]", "[0][8]", "[0][9]"
      ],
      "sorting": [ "[0][0]", "[0][1]" ]
    },
    {
      "id":5,"Name":"PROJECT", "sources": [4],
      "columns": [
        "[0][0]", "[0][1]", "[0][2]", "[0][3]", "[0][4]",
        "[0][5]", "[0][6]", "[0][7]", "[0][8]", "[0][9]"
      ],
      "labels": [
        null, null, "sum_qty", "sum_base_price",
        "sum_disc_price", "sum_charge", "avg_qty",
        "avg_price", "avg_disc", "count_order"
      ]
    }
  ],
  "root": 5
}
```

724 PLAN FLOW (CONTINUED)

703

704 ⤴

```
                    726 ANNOTATIONS
"annotations": [
    { "hints": "NO_USE_OLAP_ENGINE" },
    {
        "id": 3,
        "selectivities": "[0][0], [0][1] : 0.000000666531694"
    }
],
```

```
                    728 EXECUTION PLAN
"execution plan": [
    {"type" : 3},
    {"bz9-A5f30_qWns4 . . .
            . . . UJjo62_Pyhciwl21"
    }
]
```

815 SQL QUERY

```
SELECT TOP 100
    s_acctbal,
    s_name,
    n_name,
    p_partkey,
    p_mfgr,
    s_address,
    s_phone,
    s_comment
FROM
    part, supplier, partsupp, nation, region
WHERE
    p_partkey = ps_partkey
    AND s_suppkey = ps_suppkey
    AND p_size = 32
    AND p_type LIKE '%BRASS'
    AND s_nationkey = n_nationkey
    AND n_regionkey = r_regionkey
    AND r_name = 'EUROPE'
    AND ps_supplycost = (
        SELECT
            MIN(ps_supplycost)
        FROM
            partsupp, supplier, nation, region
        WHERE
            p_partkey = ps_partkey
            and s_suppkey = ps_suppkey
            and s_nationkey = n_nationkey
            and n_regionkey = r_regionkey
            and r_name = 'EUROPE'
    )
ORDER BY
    s_acctbal DESC,
    n_name,
    s_name,
    p_partkey
```

FIG. 8A

```
                    822 DATA SOURCE
"data_source": [
  {
    "id":1,"database":"PS1","schema":"SYSTEM","name":"part",
    "type": "ROW TABLE",
    "columns": [
        { "name": "p_partkey",   "type": "INTEGER" },
        { "name": "p_mfgr",      "type": "DECIMAL(10,2)" },
        { "name": "p_size",      "type": "VARCHAR(20)" },
        { "name": "p_type",      "type": "DECIMAL(10,2)" }
    ],
    "indexes": [{
        "name":"#part_p_partkey", "columns":["p_partkey"],
        "type":"BTREE", "unique": true
    }],
    "partitions": [ { "id": 1, "volume":1 } ]
  },
  {
    "id":2,"database":"PS1","schema":"SYSTEM","name":
        "partsupp",
    "type": "ROW TABLE",
    "columns": [
        { "name": "ps_partkey",    "type": "INTEGER" },
        { "name": "ps_suppkey",    "type": "INTEGER" },
        { "name": "ps_supplycost", "type": "INTEGER" }
    ],
    "indexes": [],
    "partitions": [ { "id": 1, "volume": 1 } ]
  },
  {
    "id":3,"database":"PS1","schema":"SYSTEM","name":
        "supplier",
    "type": "ROW TABLE",
    "columns": [
        { "name": "s_suppkey",   "type": "INTEGER" },
        { "name": "s_nationkey", "type": "INTEGER" },
        { "name": "s_acctbal",   "type": "INTEGER" },
        { "name": "s_name",      "type": "DECIMAL(7,2)" },
        { "name": "s_address",   "type": "DECIMAL(7,2)" },
        { "name": "s_phone",     "type": "DECIMAL(7,2)" },
        { "name": "s_comment",   "type": "DECIMAL(7,2)" }
    ],
    "partitions": [ { "id": 1, "volume": 1 } ]
  },
```

FIG. 8B

```
                822 DATA SOURCE (CONTINUED)
{
    "id":4,"database":"PS1","schema":"SYSTEM","name":
        "nation",
    "type": "ROW TABLE",
    "columns": [
        { "name": "n_nationkey", "type": "INTEGER" },
        { "name": "n_regionkey", "type": "INTEGER" },
        { "name": "n_name",      "type": "INTEGER" }
    ],
    "partitions": [ { "id": 1, "volume": 1 } ]
},
{
    "id":5,"database":"PS1","schema":"SYSTEM","name":
        "region",
    "type": "ROW TABLE",
    "columns": [
        { "name": "r_regionkey", "type": "INTEGER" },
        { "name": "r_name",      "type": "INTEGER" }
    ],
    "partitions": [ { "id": 1, "volume": 1 } ]
}
]
```

824 PLAN FLOW

```
"plan flow": {
  "operators": [
    {
      "id": 6, "Name": "DATA ACCESS",
      "sources": [ 1 ],
      "columns": [ "[0][0]", "[0][1]" ],
      "filter": "[0][2] = 32 AND [0][3] like
'%BRASS'"
    },
    {
      "id": 7, "Name": "DATA ACCESS", "sources": [ 2 ],
      "columns": [ "[0][0]", "[0][1]", "[0][2]" ]
    },
    {
      "id": 8, "Name": "INNER JOIN", "sources": [ 6, 7 ],
      "columns":["[0][0]", "[0][1]", "[1][1]", "[1][2]"],
      "join": "[0][0] = [1][0]"
    },
    {
      "id": 9, "Name": "DATA ACCESS", "sources": [ 3 ],
      "columns":["[0][0]", "[0][1]", "[0][2]", "[0][3]",
                 "[0][4]", "[0][5]", "[0][6]"]
    },
    {
      "id": 10, "Name": "INNER JOIN", "sources": [ 8, 9 ],
      "columns":["[0][0]", "[0][1]", "[0][3]", "[1][1]",
                 "[1][2]", "[1][3]", "[1][4]", "[1][5]",
                 "[1][6]"],
      "join": "[0][2] = [1][0]"
    },
```

824 PLAN FLOW (CONTINUED)

```
    {
      "id":11,"Name":"DATA ACCESS","sources":[ 4 ],
      "columns": [ "[0][0]", "[0][1]", "[0][2]" ]
    },
    {
      "id":12,"Name":"INNER JOIN", "sources":[ 10, 11],
      "columns":["[0][0]", "[0][1]", "[0][2]", "[0][4]",
                 "[0][5]", "[0][6]", "[0][7]", "[0][8]",
                 "[1][1]", "[1][2]"],
      "join": "[0][3] = [1][0]"
    },
    {
      "id":13,"Name":"DATA ACCESS", "sources": [ 5 ],
      "columns": [ "[0][0]" ],
      "filter": "[0][1] = 'EUROPE'"
    },
    {
      "id":14,"Name":"INNER JOIN", "sources":[12, 13],
      "columns": ["[0][0]", "[0][1]", "[0][2]", "[0][3]",
                  "[0][4]", "[0][5]", "[0][6]", "[0][7]",
                  "[0][9]"],
      "join": "[0][8] = [1][0]"
    },
```

FIG. 8D

824 PLAN FLOW (CONTINUED)

```
{
"id": 15, "Name": "FILTER", "sources": [ 14 ],
"columns":["[0][0]", "[0][1]", "[0][3]", "[0][4]",
           "[0][5]", "[0][6]", "[0][7]", "[0][8]"],
"subqueries":[{"root":23,"params":["[0][0]"]}],
           "filter": "[0][2] = $[0][0]"
},
{
"id":16,"Name":"DATA ACCESS","sources": [ 2 ],
"columns": [ "[0][1]", "[0][2]" ],
"filter": "[0][0] = :[]0]"
},
{
"id":17,"Name":"DATA ACCESS","sources": [ 3 ],
"columns": [ "[0][0]", "[0][1]"]
},
{
"id":18,"Name":"INNER JOIN","sources":[16,17],
"columns": [ "[0][1]", "[1][1]" ],
"join": "[0][0] = [1][0]"
},
{
"id":19,"Name":"DATA ACCESS","sources": [ 4 ],
"columns": [ "[0][0]", "[0][1]" ]
},
{
"id":20,"Name":"INNER JOIN","sources":[18, 19],
"columns": [ "[0][0]", "[1][1]" ],
"join": "[0][1] = [1][0]"
},
```

824 PLAN FLOW (CONTINUED)

```
{
"id":21,"Name":"DATA ACCESS","sources": [ 5 ],
"columns": [ "[0][0]" ],
"filter": "[0][1] = 'EUROPE'"
},
{
"id":22,"Name":"INNER JOIN", "sources":[20, 21],
"columns": [ "[0][0]" ],
"join": "[0][1] = [1][0]"
},
{
"id":23,"Name":"GROUP BY", "sources": [ 22 ],
"columns": [ "[][0]" ],
"operations": [{
    "aggregation": ["min([0][0])"]
}]
},
{
"id":24,"Name":"ORDER BY", "sources": [ 15 ],
"columns":["[0][0]", "[0][1]", "[0][2]", "[0][3]",
           "[0][4]", "[0][5]", "[0][6]", "[0][7]"],
"sorting_column":["[0][2]", "[0][7]", "[0][3]",
           "[0][0]"],
"sorting_type": [ "desc", null, null, null ],
           "limit": 100, "offset": null
}
```

824 PLAN FLOW (CONTINUED)

```
    {
      "id": 25, "Name": "PROJECT", "sources": [ 24 ],
      "columns": ["[0][2]","[0][3]","[0][7]","[0][0]",
                  "[0][1]","[0][4]","[0][5]","[0][6]"],
      "labels":[null,null,null,null,null,null,null,
                null]
    }
  ],
  "root": 25
},
```
← 806

*FIG. 8F*

826 ANNOTATIONS

```
"annotations": [
  { "hints": "NO_USE_OLAP_JOIN" },
  {
    "id":8, "join_cardinality": "1..n",
    "selectivities": "[0][0] = [1][0] : 1"
  }
]
```
← 807

*FIG. 8G*

915 SQL QUERY

```
Select a, b, sum(c) + sum(d * 2), avg(e) from t1 group by a, b
```

FIG. 9A                                              ↖—901

924 PLAN FLOW

```
"plan_flow": {
   "operators": [
      {
         "id": 3, "name": "DATA ACCESS", "sources": [1],
         "columns": [
            "[0][0]", "[0][1]", "[0][2]", "[0][3]", "[0][4]"
         ],
      },
      {
         "id": 4, "name": "GROUP BY", "sources": [3],
         "columns": [
            "[][0]", "[][1]", "[][2] + [][3]", "[][4]"
         ],
         "operation": [
            { "grouping" : [ "[0][0]", "[0][1]" ] },
            { "aggregation" : [
               "SUM( [0][2] )",
               "SUM( [0][3] * 2 )",
               "AVG( [0][4] )"
            ]}
         ]
      },
      {
         "id": 5, "name": "PROJECT", "sources": [4],
         "columns": [
            "[0][0]", "[0][1]", "[0][2]", "[0][3]"
         ]
         "labels": [ null, null, null, null ]
      }
   ],
   "root": 5
}
```

FIG. 9B                                              ↖—902

1015 SQL QUERY

```
Select top 10 * from (
    Select a from t1
    UNION
    Select b from t2
);
```

1024 PLAN FLOW

```
"plan_flow": {
    "operators": [
        {
            "id": 3, "name": "DATA ACCESS", "sources": [1],
            "columns": [ "[0][0]" ],
        },
        {
            "id": 4, "name": "DATA ACCESS", "sources": [2],
            "columns": [ "[0][0]" ],
        },
        {
            "id": 5, "operator": "UNION ALL", "sources": [3, 4],
            "columns": [ "[][0]" ],
            "operation": [
                { "union": [ "[0][0]", "[1][0]" ] }
            ],
            "limit": 10
        },
        {
            "id": 6, "operator": "PROJECT", "sources": [5],
            "columns": [ "[0][0]" ]
            "labels": [ null ]
        }
    ],
    "root": 6
}
```

STAGED QUERY COMPILATION WITH COMMON DATA STRUCTURE

BACKGROUND

Declarative languages (e.g., SQL) and queries are widely used in database applications, and require compilation into a procedure that can provide the desired query results. A plan can be used to describe such a procedure, with varying levels of detail. However, as database technologies continue to evolve, multiple software modules can participate in query compilation. Existing approaches to query handling and compilation can be fragile in several scenarios. In one aspect, interfacing between a query optimizer and other modules or services can lead to maintenance challenges as either side of the interface undergoes a version change. In another aspect, as compilation or optimization improve, plans can change, and could sometimes give unexpected results. Existing approaches may lack facilities for tracking or diagnosing plan changes. Accordingly, there remains a need for improved technologies to manage query compilation in a modern database deployment.

SUMMARY

In brief, the disclosed technologies utilize a data structure specification for a query plan that can provide stability in a number of use cases. The specification is applicable to a logical plan or a physical plan (collectively, intermediate plans) and extensible to an execution plan. For a logical plan, the data structure specification can provide fields for specifying data sources and a plan flow. For a physical plan, the data structure specification can provide additional fields for annotations (e.g., hints). The data structure specification can be extended to support storage of an execution plan, e.g. in serialized form. As query compilation proceeds in stages, fields or field values can be added to an existing data structure in some examples. In other examples, separate data structure instances can be used for each stage. A hub architecture can flexibly support a range of staged compilation workflows.

In a first use case, a plan at one stage of compilation can be received from one software module. The plan can be stored according to the data structure specification and conveyed to a second software module for a second stage of compilation or, in the case of an execution plan, for execution. In another use case, a query can be directed in normal fashion to an inline query optimizer for real-time compilation, and can also be directed to an offline optimizer. The result of the offline optimizer can be used as input to the inline query optimizer on a subsequent invocation of the same query. In a further use case, a plan can be received from an external service or provided to the external service for compilation or execution. That is, the data structure specification can provide a stable interface for communicating plans across compilation stages, over time, or between assorted software modules. Still further, stored plans can serve to cache plans between compilation stages, or preserve a history of plans across evolution of optimizer technology, database architecture, or underlying platform.

In certain examples, the disclosed technologies can be implemented as a computer-implemented method for compiling a declarative database query. A physical plan for the query is received from a first software module. The physical plan includes one or more data sources, a plan flow, and one or more annotations stored as respective fields of a plan data structure. A second software module is instructed to determine an execution plan for the physical plan.

In some examples, the first software module can be an offline query optimizer. Before the receiving, the offline query optimizer can be instructed to determine the physical plan for the query. The offline query optimizer can be thus instructed in response to a first instance of the query being received from a first client. The execution plan can be executed in response to a subsequent instance of the same query being received from a second client. A specification for the plan data structure can include an optional field for an execution plan. The plan data structure can be augmented with the execution plan in the optional field. The first software module can execute the execution plan from the augmented plan data structure. The annotations can include a scoped hint to the second software module. Another software module can be instructed to execute the execution plan and obtain results for the query. The results can be forwarded to the first software module.

In further examples, the execution plan can be a first execution plan, and the second software module can undergo a version change into a third software module. Subsequently, the third software module can be instructed to determine a second execution plan for the physical plan. The version change can cause the second execution plan to be different from the first execution plan.

In certain examples, the disclosed technologies can be implemented as a system having one or more hardware processors, with memory coupled thereto, together with computer-readable media storing at least the following instructions executable by the hardware processors. First instructions, upon execution, cause a logical plan for a database query to be received from a first software module. Second instructions, upon execution, cause a second software module to determine a physical plan for the logical plan. The logical plan and the physical plan each comprise one or more data sources and a plan flow stored according to a common data structure specification. The physical plan can include one or more annotations also stored according to the common data structure specification.

In some examples, the second software module can include an inline query optimizer. The common data structure specification can remain invariant over a version change of the second software module. The database query can be an SQL query. The first software module can implement all or part of a multi-dimensional service. The logical plan can be stored in a first data structure according to the common data structure specification. The second instructions, when executed, can cause the one or more annotations to be added to the first data structure. The instructions can include third instructions which, upon execution, cause a third software module to: determine an execution plan for the physical plan and augment the stored physical plan with the execution plan.

In certain examples, the disclosed technologies can be implemented as computer-readable media storing at least the following first through fifth instructions executable on hardware processors. When executed, the first instructions cause receipt of a declarative database query. When executed, the second instructions instruct a first software module to determine a first intermediate plan for the query. When executed, the third instructions instruct a second software module to determine an execution plan for a second intermediate plan. When executed, the fourth instructions cause a third intermediate plan to be received from a third software module. When executed, the fifth instructions cause a fourth intermediate plan to be stored or retrieved. Each intermediate plan of the first, second, third, and fourth intermediate plans includes one or more data sources and a plan flow, and is organized as a serialized data structure conforming to a common specification, which provides a field for the plan flow and additional one or more fields for the one or more data sources. The common specification also provides, for a case in which a given intermediate plan has one or more annotations, one or more additional fields for the one or more annotations.

In some examples, the executable instructions include sixth and seventh instructions. When executed, the sixth instructions cause the second intermediate plan to be augmented with the execution plan. When executed, the seventh instruction cause the execution plan to be executed by a fourth software module. In respective cases, the fourth instructions can cause respective intermediate plans to be received from respective different software modules, including the third software module.

In further examples, the first software module can be an offline query optimizer, the second software module can include an inline query optimizer, and the third software module can implement part or all of a multi-dimensional service. The executable instructions can include seventh instructions which, upon execution, cause a sixth intermediate plan to be determined for a fifth intermediate plan. The sixth intermediate plan, including one or more annotations, and the fifth intermediate plan can be stored according to the common specification.

The foregoing and other objects, features, and advantages of the invention will become more apparent from the following detailed description, which proceeds with reference to the accompanying figures.

BRIEF DESCRIPTION OF THE DRAWINGS

FIGS. 6A-6E are diagrams of an example plan data structure specification according to the disclosed technologies.

FIGS. 7A-7E are diagrams of a first query and an associated example plan data structure according to the disclosed technologies.

FIGS. 8A-8G are diagrams of a second query and an associated example plan data structure according to the disclosed technologies.

FIGS. 9A-9B are diagrams showing a third query and an associated plan flow according to the disclosed technologies.

FIGS. 10A-10B are diagrams showing a fourth query and an associated plan flow according to the disclosed technologies.

DETAILED DESCRIPTION

Figure 1:
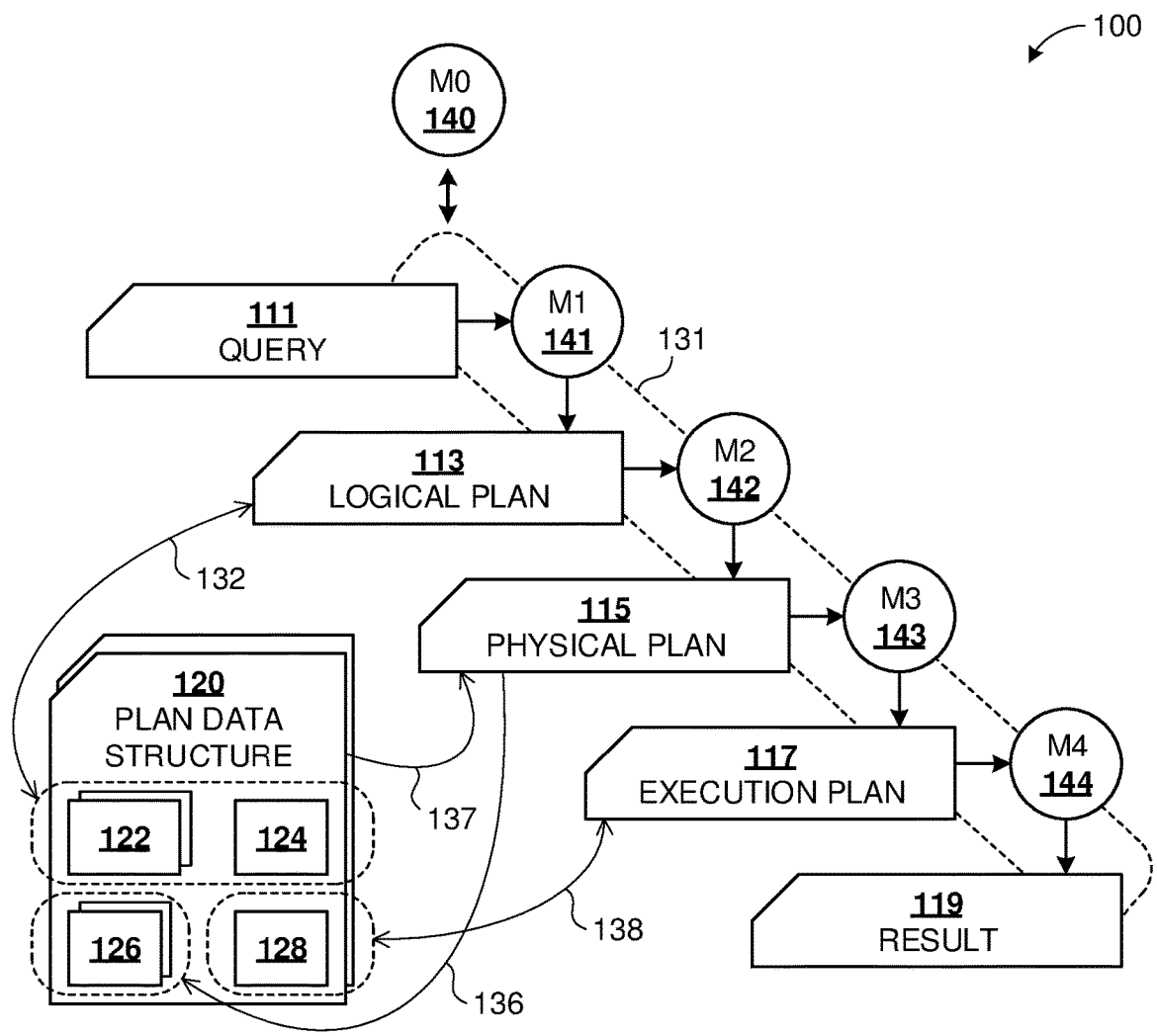
FIG. 1 is a data flow diagram illustrating an example of staged query compilation according to the disclosed technologies.

Overview Declarative queries (e.g., SQL queries) require compilation into a procedure that can provide the desired query results. A plan can be used to describe such a procedure, with varying levels of detail. Staged compilation can be used to refine a plan with increasing detail and optimization until an execution plan, mapped precisely to an underlying database implementation, is obtained.

The disclosed technologies provide a data structure specification for storing a query plan that can provide stability in a number of use cases. The specification is applicable to a logical plan or a physical plan (collectively, intermediate plans) and extensible to an execution plan. For a logical plan, the data structure specification can provide fields for specifying data sources and a plan flow. For a physical plan, the data structure specification can provide additional fields for annotations (e.g., hints). The data structure specification can be extended to support storage of an execution plan, e.g. in serialized form. A plan data structure can be augmented or modified as compilation proceeds through successive stages, while adhering to the same specification.

A stable data structure specification provides additional benefits. As database technologies continue to evolve, multiple software modules can participate in query compilation and fulfillment. An interoperable plan data structure provides a common medium of exchange, as plan data structures can be output from one module, input to another module, saved to a repository, or modified.

In a first use case, a plan at one stage of compilation can be received from one software module. The plan can be stored according to the data structure specification and conveyed to a second software module for a second stage of compilation or, in the case of an execution plan, for execution. In another use case, a query can be directed in normal fashion to an inline query optimizer for real-time compilation, and can also be directed to an offline optimizer. The result of the offline optimizer can be used as input to the inline query optimizer on a subsequent invocation of the same query. In a further use case, a plan can be received from an external service or provided to the external service for compilation or execution. That is, the data structure specification can provide a stable interface for communicating plans across compilation stages, over time, or between assorted software modules. Still further, stored plans can serve to cache plans between compilation stages, or preserve a history of plans across evolution of optimizer technology, database architecture, or underlying platform.

These and other advantages of the disclosed technologies will become apparent from the examples described herein.

Terminology

An "annotation" is metadata accompanying a plan flow to guide downstream compilation or execution stages. An annotation can guide selection or implementation of a physical algorithm for one or more operations of a plan flow. Annotations can pertain to an entire plan flow, or can be "scoped" to pertain to one or a group of components which are a proper subset of the plan flow. Annotations can be descriptive (e.g., describing or explaining a plan or component), suggestive (providing non-mandatory guidance to a downstream stage), or imperative (providing mandatory guidance to a downstream stage). A suggestive annotation is dubbed a "hint." By way of non-limiting illustration, annotations can include SQL hints, filter selectivity, or comments.

The term "augment" refers to incorporating one or more new data items into an existing data structure. In some scenarios, a new data item can be stored at an existing field of the data structure, which previously could have been empty or could have had null or another placeholder value. In other scenarios, a new data item can be stored at a new field created to hold the new value. The field storing the new data item can be a field at any level of a hierarchically organized data structure. To illustrate, a plan data structure can be augmented by adding a new top-level field for an execution plan, by adding a new field for a new annotation, or by adding a new data item to an existing annotation.

The term "compile" refers to developing an execution plan for a query, or a stage thereof. A compile operation can be performed by an optimizer. An input or output to a compile operation can be stored in a plan data structure.

The unqualified term "data" refers to any digital representation of information. "Data items" are data entities whose values convey particular meaning to a software application.

The term "database" refers to an organized collection of data maintained on computer-readable media and accessible by execution of instructions at one or more processors. Databases can be relational, in-memory or on disk, hierarchical or non-hierarchical, or any other type of database.

A "data structure" is a collection of values for respective fields, and can also include "undefined" fields for which no value has been defined. Fields having values are dubbed "defined". An undefined field can be encoded with a Null byte or in another way. Some data structures of interest in this disclosure are plan data structures. A data structure can be extensible, meaning that new fields can be added to it, or variable, meaning that fields can be added or deleted. A data structure can have a "specification" defining the fields of the data structure; the data structure is considered an "instance" of its specification. A specification can have multiple instances. To illustrate, multiple plan data structures, according to a common specification, can store respective query plans. As used herein, a "common" data structure specification can be common to three or more plans, shared among three or more stages of query compilation, used by three or more software modules, or maintained across one or more version upgrades.

In the context of query plans, a "field" is a member of a plan data structure having a particular role. A field can hold a stored value, or can be undefined. To illustrate, a given field of a plan data structure can hold an identifier of a data source, while another field can hold an annotation. The term field may also be used in context of other data structures including tables of a relational database.

The term "forward" refers to transmitting a data item or message received from one software module or computer to another software module or computer.

A "master data service" is a service in a software environment through which master data of an organization can be managed. Because master data can be stored in a database, like any other data, a master data service can receive and handle queries. In support of query handling, a master data service can be a client of a query optimizer and can interface with the query optimizer through a plan stored in a plan data structure as described herein. In some examples, a master data service can issue or forward a query and receive a plan in response. In other examples, a master data service can provide an intermediate plan and receive an execution plan or query results in return.

Conventional database operations can be one-dimensional operations on two-dimensional tables. A "multi-dimensional service" is a service in a database environment supporting higher dimensionality operations. A multi-dimensional query can include aggregation, transformation, or calculation functions. The multi-dimensional service can be a client of a query optimizer through a plan stored in a plan data structure as described herein. In some examples, the multi-dimensional service can transform a client query into SQL which can be transmitted to a query optimizer, leading to a plan being received in response. In other examples, the multi-dimensional service can transform a client query into a logical plan which can be conveyed to a query optimizer; an execution plan or query results can be received in response.

The term "optimizer" (or, "query optimizer") refers to a software module that performs at least a stage of query compilation. The input to an optimizer can be a query, a portion of a query, or a plan from an earlier compilation stage. The output from an optimizer can be an intermediate plan or an executable plan. Often, an optimizer attempts to an output that is optimal according to some criterion (e.g., speed of execution or memory requirement), at least with respect to one or more other choices considered. However, this is not a requirement, and in some examples or for some inputs, an optimizer can generate output without evaluating any alternatives. An "inline" optimizer operates in real-time, e.g. with expectation that a consumer of its output is waiting for the output. Accordingly, it can be desirable that execution time of an inline optimizer be short. An "offline" optimizer operates with expectation that its output will be consumed at some future time after the output is generated. Accordingly, an offline optimizer can prioritize quality of result over execution time of the offline optimizer. To illustrate, where an inline optimizer could consider about 1,000 alternatives (often 100 to 10,000 alternatives), an offline optimizer could consider 1,000,000 alternatives (often 10,000 to 100,000,000). Considered alternatives can be complete plans, subquery plans, portions of plans, or other decision criteria. An offline optimizer can also use machine learning, dynamic programming, or other exploration techniques that may not be feasible for a time-constrained inline optimizer. Although some examples of the disclosed technologies operate in conjunction with a declarative (e.g., SQL) query, this is not a requirement. In other examples, a procedural query can also be optimized in one or more stages, e.g. using knowledge of physical algorithms or an underlying database implementation, to advance the procedural query to a more specific plan or to develop an execution plan.

A "plan" (or "query plan") is a procedural description of how a query is to be fulfilled. Plans can exist at varying levels of specificity, and can be developed (compiled) in stages, with each stage providing more specificity or reducing ambiguities as compared to a preceding stage. A "logical plan" describes an ordered sequence of high-level operations that can be used to fulfill the query. To illustrate, if the query requires data from three data sources A, B, C, then the logical plan can specify ((A join B) join C), thereby eliminating (A join (B join C)) or other options. The ordered sequence of operations is dubbed a "plan flow". The plan flow and the data sources together constitute the logical plan. Description of physical algorithms can be absent from a logical plan. A "physical plan" can build on the logical plan by incorporating annotations to guide selection or implementation of a physical algorithm for an operation of the logical plan, e.g. based on knowledge of the data sources. To illustrate, an annotation can prohibit or recommend OLAP (online analytic processing) joins for one or more join operations in the query. Another annotation can specify the join cardinality for a given join operation. An "execution plan" can result from mapping the physical plan onto an underlying database, using knowledge of the physical structure of the database, database schema, architecture, partitioning, storage tiers, or suchlike. An execution plan can be executed directly with no further compilation. An execution plan can be specific to a particular landscape. To illustrate, a database can have on-premise and cloud instances. A given query can have the same logical plan and the same physical plan for both database instances, however the execution plans can differ.

A "query" (or "database query") is a request for information within a database environment. The acts of compiling the query, retrieving any required data, analyzing the retrieved data as needed to determine the requested information, and responding to the query with the requested information, are collectively dubbed "fulfillment" of the query. A query "result" refers to the requested information. A "declarative" query is a query that expresses the result to be returned without expressing how the result is to be obtained. A single query can be executed multiple times (e.g., to produce a daily, weekly, or monthly report from a database), which are denoted as "instances" of the query.

In the context of queries and corresponding responses, the terms "receive," "transmit," or "convey" refer to communication over a network, which can be in the form of a message. The communication can be electromagnetic, e.g. over wired, wireless, or optical media, but this is not a requirement. Communication of a data entity (such as a plan data structure or field thereof) can be performed by communicating the entire data of the communicated entity, or by reference (such as passing a link, pointer, or other address of the data entity).

"SQL" refers to Structured Query Language and variations and revisions thereof. SQL is a declarative programming language.

A "stage" refers to one or more compile operations that advances a query plan from one level of specificity to another level having greater specificity or less ambiguity. In some examples, compilation can proceed in three stages, e.g. query→logical plan→physical plan→execution plan, but this is not a requirement. In other examples, one or both of the logical and physical plans can be omitted, to perform compilation in just one or two stages. Other organizations of compilation stages can also be used.

As applied to data items, the term "store" refers to writing a value of the data item to a location on a storage medium, and the term "retrieve" refers to reading a value of the data item from a location on a storage medium. Non-limiting examples of storage media can include a hard disk or semiconductor memory. Data items can include atomic data items, such as an integer, a Boolean value, or a string, and can also include a data structure, e.g. a plan data structure, or one or more fields therein.

As applied to software module having a query plan as an input or an output, a "version change" refers to a change in the software module that results in the old and new versions of the software module producing different output for a same input. A version change can also cause unchanged input data to be interpreted in a different way.

"Software" refers to computer-executable programs, instructions, or associated data structures. Software can be in active or quiescent states. In an active state, software can be loaded into memory, or can be undergoing execution by one or more processors. In a quiescent state, software can be stored on computer-readable media, awaiting transmission or execution. An "instruction" (or "program instruction") encodes an operation (sometimes, together with one or more operands, operand addresses, or destination addresses) to be performed by a processor. A group of instructions can be organized to perform a function. Software can be organized as a "module", containing one or more functions and associated data directed to a common task or group of related tasks. Software can be offered as a service, which can be implemented by one or more modules.

Example Dataflow

FIG. 1 is a data flow diagram 100 illustrating an example of staged query compilation according to the disclosed technologies. In this diagram, a query is compiled and executed in stages to obtain a result. The data flow can be orchestrated by a hub software module and can be performed using one or more plan data structures, as disclosed herein, for intermediate or archival storage. Although FIG. 1 shows a complete process from query to result, it is not required that the disclosed technologies implement the complete process as illustrated. In some examples, the disclosed technologies can be used to perform a portion of the illustrated data flow. In other examples, a portion of the illustrated data flow can be performed on one instance of a query, and a compiled or partially compiled plan data structure can be used to fulfill a subsequent instance of the same query. In FIG. 1, data objects are depicted as rectangles with beveled edges or simply rectangles, while operations are depicted as circles.

Initially, a query 111 can be input to software module M1 141 to produce logical plan 113. As depicted by arrow 132, components of logical plan 113 can be stored to plan data structure 120. These components can include one or more data sources 122 and plan flow 124.

At a next stage, software module M2 142 can perform a next compilation stage on logical plan 113 to obtain physical plan 115. As depicted by arrow 136, plan data structure 120 can be augmented with one or more annotations 126 from physical plan 115. In some scenarios, annotations 126 can be stored in a same instance of plan data structure 120 as logical plan 113 while, in other scenarios, a new instance of plan data structure 120 can be created to store the entire physical plan 115, including data sources 122, plan flow 124, and annotations 126. Often, data sources 122 and plan flow 124 remain unchanged from logical plan 113 to physical plan 115, but this is not a requirement. In other scenarios, optimization by module M2 142 can result in changes to data sources 122 or plan flow 124. To illustrate, optimization can reduce the number of rows required to be processed, and this can cause a change in a data source 122.

At a following stage, software module M3 143 can generate execution plan 117 from physical plan 115. As indicated by arrow 138, plan data structure 120 can be augmented with execution plan 128, which can be a serialized form of execution plan 117. In some scenarios, execution plan 117 can be stored in a same instance of plan data structure 120 as logical plan 113 or physical plan 115 while, in other scenarios, a new instance of plan data structure 120 can be created to store execution plan 117. Often, data sources 122, plan flow 124, or annotations 126 remain unchanged during optimization of execution plan 117 by software module M3 143, but this is not a requirement. In other scenarios, optimization by module M3 143 can result in changes to data sources 122, plan flow 124, or annotations 126. Particularly, optimizer M3 143 can override the suggestion of a physical plan, regarding a physical algorithm for a given operation, with its own determination. Such changes can also be back-annotated into plan data structure 120. To illustrate, module M3 can reject a hint in annotations 126, which can result in this hint being deleted from plan data structure 120.

Alternatively, module M3 can memorialize one or more aspects of its optimized solution as constraints which can be saved as new annotations 126 (either hints or imperatives). Thereby, even if module M3 143 undergoes a version change, the new annotations 126 can guide updated module M3 so that a previous optimization is not lost. That is, updated module M3 may find a superior solution for execution plan 117, but the risk of converging on an inferior solution can be reduced.

Then, execution plan 117 can be executed by software module M4 144 to obtain query results 119, which can be stored, transmitted to a requesting client, or used as input for additional query processing. For example, query 111 can be a subquery and results 119 can be supplied to a parent query.

In examples, software module M0 140 can orchestrate the illustrated data flow, instructing one or more of the depicted operations 131 to be performed, in any combination. Software module M0 140 can also manage reading or writing of plan data structure 120 depicted by arrows 132, 136-138.

In FIG. 1, arrows 132, 138 are bidirectional, indicating that components of plan data structure can be read or written during the illustrated data flow. That is, logical plan components 122, 124 determined by module M1 141 can be written to plan data structure 120, and the same components provided as input to module M2 142 can be read (arrow 132) from plan data structure 120. Similarly, execution plan 117 determined by module M3 143 can be written to plan data structure 120, and the same execution plan provided as input to module M4 144 can be read from plan data structure 120 (arrow 138). In some examples, the physical plan 115 determined by module M2 142 can result in just annotations 126 being written to plan data structure 120, as shown by arrow 136. However, input of physical plan 115 to module M3 143 can include reading all components 122, 124, 126 from plan data structure 120, as indicated by arrow 137.

In some examples, one or more of plans 113, 115, or 117 can have temporary but non-transitory instantiations either within or between modules M1-M4 141-144, separate from plan data structure 120. In other examples, one or more of plans 113, 115, 117 can exist solely as non-transitory persistent plan data structure 120. That is, one or more of modules M1-M4 141-144 can operate directly on plan data structure 120.

The staged compilation illustrated in FIG. 1 is merely illustrative, and numerous variations or extensions can be implemented within scope of the disclosed technologies, some of which are described above or in other sections of this disclosure. Variations can include consolidation of one or more of the illustrated stages. To illustrate, compilation stages performed by modules M1-M2 141-142 can be consolidated to produce physical plan 115 directly from query 111, and storing the entire physical plan 115 (including components 122, 124, 126) in plan data structure 120. Alternatively, compilation stages performed by modules M2-M3 142-143 can be consolidated to produce execution plan 117 directly from logical plan 113, without exposing any intermediate physical plan. Still further, compilation stage M3 143 can be combined with execution stage M4 144 to directly compile and execute from physical plan 115.

First Example Method

Figure 2:
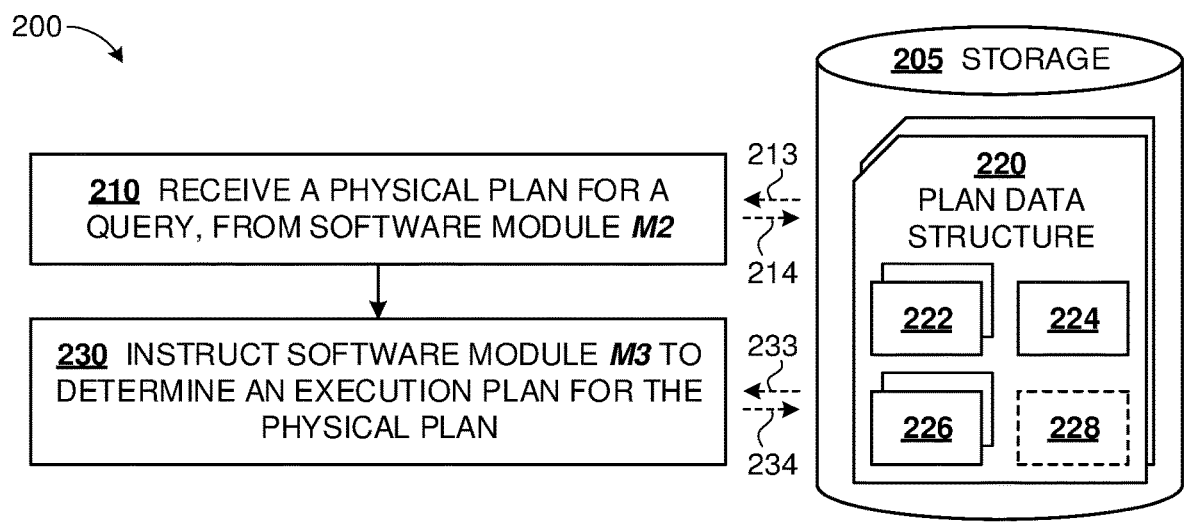
FIG. 2 is a flowchart of a first method for query compilation according to examples of the disclosed technologies.

FIG. 2 is a flowchart 200 of a first method for query compilation according to examples of the disclosed technologies. In this method, a physical plan is received, following which generation of an execution plan is triggered. A plan data structure, as disclosed herein, is used. The instant method can be performed by a software module M0 (not shown), similar to module 140 of FIG. 1.

At block 210, a physical plan for a declarative database query can be received from a first software module M2. The physical plan can have one or more data sources 222, a plan flow 224, and one or more annotations 226, all of which can be stored as fields of plan data structure 220. Plan data structure 220 can be stored on a storage device 205 accessible to the software module M0.

At block 230, software module M3 can be instructed to determine an execution plan for the physical plan.

Numerous extensions and variations of this method can be implemented within the scope of the disclosed technologies. One or more of annotations 226 can be hints to module M3. That is, these hints can guide the determination of the execution plan. Particularly, the annotations can be scoped hints, applicable to one or more operations of plan flow 224 but not to the entirety of plan flow 224. Plan data structure can also optionally include field 228 where the execution plan determined by module M3 can be stored. The execution plan can be stored as a serialized string, e.g. in base-64 encoding.

Dashed line arrows 213-214, 233-234 represent interaction between software module M0 and storage 205 storing plan data structure 220. In some examples, the physical plan stored as plan data structure 220 can be received from storage 205 at block 210, as shown by arrow 213. To illustrate, module M2 can be a manager or client of storage 205, and can direct data structure 220 to be conveyed to module M0 so that the physical plan can be received at block 210. Alternatively, module M2 can provide module M0 with a pointer to structure 220, allowing module M0 to retrieve the structure 220. In other examples, the physical plan can be received from another source, and module M0 can store the physical plan as plan data structure 220 upon receipt, e.g. as part of block 210 or at a later time, as indicated by arrow 214.

In further examples, as part of or prior to performance of block 230, module M0 can retrieve data structure 220 or a link to data structure 220, as indicated by arrow 233, and can pass the data structure or the link to module M3 as part of process block 230. Still further, after the determination of the execution plan, the execution plan can be stored as field 228 of plan data structure 220, as indicated by arrow 234. Execution plan 228 can variously be stored by module M0 or directly by module M3.

In some examples, module M2 can be an offline optimizer, and the method can be extended, e.g. prior to performing block 210, by another process block at which the offline query optimizer is instructed to determine the physical plan. The instruction to the offline optimizer can be performed responsive to a first instance of a query being received from a first client. After the offline optimizer has completed its task (and after the execution plan from block 230 is available), a second instance of the same query can be received. Then, the execution plan can be executed (e.g., from field 228) in response to the second query instance. In some examples, the second client can be distinct from the first client while, in other examples, the second client can be the first client.

In some examples, module M2 can be part of an external service such as a multi-dimensional service. After the execution plan is determined, it can be conveyed back to originating software module M2 for execution. In this way, module M0 (and M3) can provide a service to module M2: receiving a physical plan and returning an execution plan. In other examples, subsequent to determination of the execution plan, module M0 can instruct a third software module M4 to execute the execution plan, thereby obtaining results for the instant query, and the results can be forwarded to the first software module M2. In such examples, modules M0, M3, and M4 can provide a service to module M2: receiving a physical plan and returning query results. The execution plan can also be returned to module M2, along with the query results.

In some scenarios, a version change of software module M3 can occur after block 230 has been performed and the corresponding (first) execution plan has been determined. Then, the physical plan (e.g., stored as data structure 220) can be re-used to perform block 230 with the new version of software module M3, resulting in a different (second) execution plan. The two execution plans can be stored in respective instances of plan data structure 220. That is, both instances of structure 220 can store identical copies of the physical plan (e.g., fields 222, 224, 226) but different versions of execution plan (as respective fields 228). Metadata or a log file associated with the plan data structures 220 or the environment of storage 205 can specify the provenance of the respective fields of plan data structures 220. To illustrate, the metadata can indicate that one instance of field 228 was determined by an original version of software module M3, while the other instance of field 228 was determined by the updated version of module M3.

Second Example Method

Figure 3:
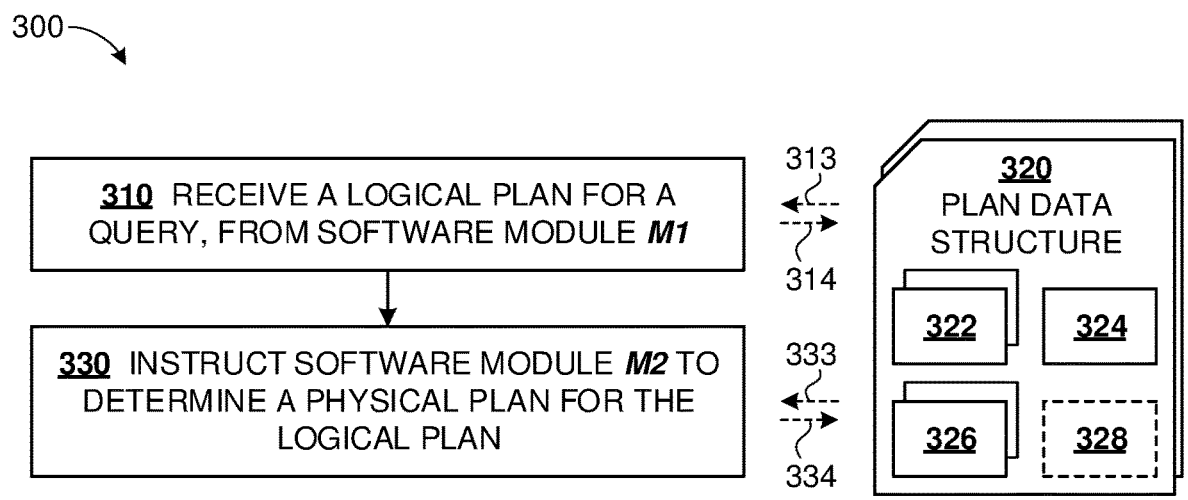
FIG. 3 is a flowchart of a second method for query compilation according to examples of the disclosed technologies.

FIG. 3 is a flowchart 300 of a second method for query compilation according to examples of the disclosed technologies. In this method, a logical plan is received, following which generation of a physical plan is triggered. A plan data structure, as disclosed herein, is used. The instant method can be performed by a software module M0 (not shown), similar to module 140 of FIG. 1.

At block 310, a logical plan for a database query can be received from a first software module M1. The logical plan can have one or more data sources 322 and a plan flow 324, each of which can be stored as respective fields according to a common data structure specification (e.g., in plan data structure 320). Plan data structure 320 can be stored on a storage device (similar to 205) accessible to the software module M0 performing the instant method.

At block 330, software module M2 can be instructed to determine a physical plan for the logical plan. The physical plan can also be stored in the same or another instance of plan data structure 320, including data source(s) 322, plan flow 324, and annotation(s) 326. That is, a common data structure specification can be used to store both the logical plan and the physical plan.

Numerous extensions and variations of this method can be implemented within the scope of the disclosed technologies. In varying examples, the physical plan determined by module M2 can be returned to module M0 or can be stored directly in a plan data structure 320. In turn, another software module M3 can be instructed to compile physical plan into an execution plan. Annotation(s) 326 can be used as hint(s) by module M3. Plan data structure 320 can also optionally include field 328 where the execution plan can be stored.

Dashed line arrows 313-314, 333-334 represent input or output (e.g., reads or writes) of plan data structure 320 by software module M0. In some examples, the logical plan stored as fields 322, 324 of plan data structure 320 can be received at block 310, as shown by arrow 313. To illustrate, module M1 can direct fields of data structure 320 to be conveyed to module M0, whereby the logical plan can be received at block 310. Alternatively, module M1 can provide module M0 with a pointer to structure 320 (or pointers to fields 322 or field 324) allowing module M0 to retrieve fields of the structure 320. In other examples, the logical plan can be received from another source, and module M0 can store the logical plan as plan data structure 320 upon receipt, as indicated by arrow 314, e.g. as part of block 310 or at a later time.

In further examples, as part of or prior to performance of block 330, module M0 can retrieve data structure 320 or a link to data structure 320, as indicated by arrow 333, and can pass the data structure or the link to module M2 as part of process block 330. Still further, after the determination of the physical plan, annotation(s) of the physical plan can be stored as field(s) 326 of plan data structure 320, as indicated by arrow 334. Later, an execution plan 328 can also be stored in plan data structure 320.

In other examples, module M1 can be an offline optimizer, and the method can be extended, e.g. prior to performing block 310, by another process block (not shown) at which the offline query optimizer is instructed to determine the logical plan. The instruction to the offline optimizer can be performed responsive to a first instance of a query being received from a first client. After the offline optimizer has completed its task, a second instance of the same query can be received from a second client. The optimizations achieved by the offline optimizer, and embodied in the logical plan, can be applied to fulfill the second query instance. The remaining compilation from logical plan to execution plan can be done before or after the second query instance is received. In some examples, the second client can be distinct from the first client while, in other examples, the second client can be the first client.

In some examples, module M1 can be an external service such as a multi-dimensional service. After the physical plan (or a subsequent execution plan) is determined, it can be conveyed back to originating software module M1 for further compilation. In this way, module M0 and M2 (and optionally model M3) can provide a service to module M1: receiving a logical plan and returning a physical plan (or execution plan). In other examples, subsequent to determination of the execution plan, module M0 can instruct a fourth software module M4 to execute the execution plan, thereby obtaining results to the instant query, and the results can be forwarded to the first software module M1. In such examples, modules M0, M2, M3, and M4 can provide a service to module M1: receiving a logical plan and returning query results. The physical plan (or execution plan) can also be returned to module M1, along with the query results.

In some scenarios, a version change of software module M2 can occur after block 330 has been performed and the corresponding (first) physical plan has been determined. Then, the logical plan (e.g., stored as data structure 320) can be re-used to perform block 330 with the new version of software module M2, resulting in a different (second) physical plan. The two physical plans can be stored in respective instances of plan data structure 320. That is, both instances of structure 320 can store identical copies of the logical plan (e.g., fields 322, 324) but different versions of physical plan (as respective annotations 326). Metadata or a log file associated with the plan data structures 320 can specify the provenance of the respective fields of plan data structures 320. To illustrate, the metadata can indicate that one instance of fields 326 was determined by an original version of software module M2, while the other instance of field 326 was determined by the updated version of module M2.

In some examples, software module M2 can include an inline query optimizer. The common data structure specification used by modules M0, M1, or M2 (e.g., the specification of plan data structures 320) can be invariant over one or more version changes of modules M0, M1, or M2. The plans associated with the instant method (or plans stored as plan data structure(s) 320) can be derived by compilation of SQL queries, or other declarative queries, but this is not a requirement. Optimization or compilation of imperative queries can also be performed using the instant method or other technologies disclosed herein.

Example Environment

Figure 4:
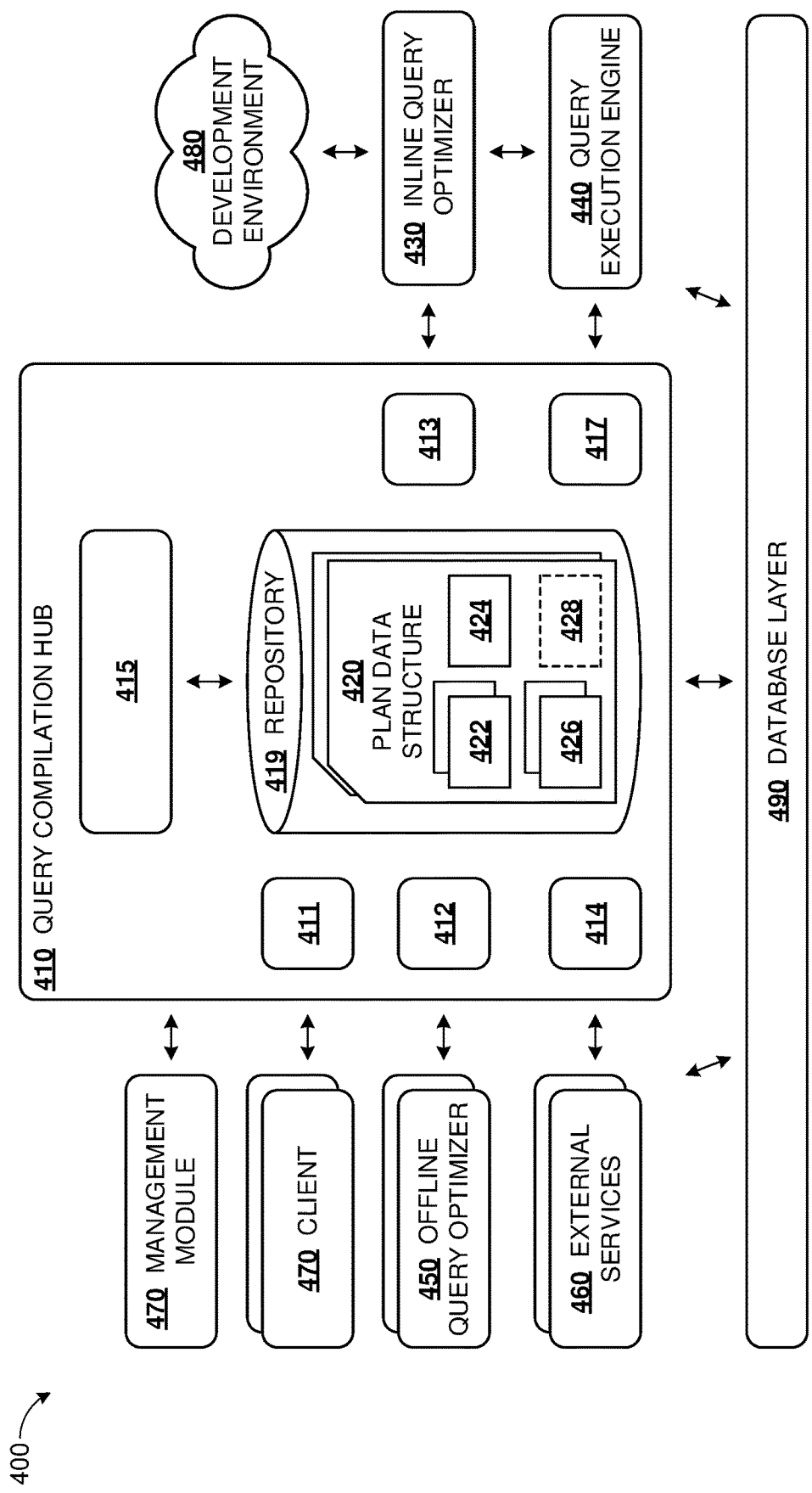
FIG. 4 is an diagram of a software environment in which examples of the disclosed technologies can be implemented.

FIG. 4 is a diagram 400 of a software environment in which examples of the disclosed technologies can be implemented. In this example, a hub interfaces with optimization modules and other software components, to orchestrate stages of query handling using a repository of plan data structures.

As shown in FIG. 4, query compilation hub 410 can incorporate software modules 411-415, 417, and can control a repository 419 of plan data structures 420.

Module 411 can provide a query interface within hub 410. Execution of instructions of module 411 can cause a query to be received, e.g. from client 470. A query can also be received from external service 460.

Module 412 can direct an intermediate plan to be generated for a query. In some examples, module 412 can instruct offline optimizer module 450 to generate the intermediate plan, while in other examples, module 412 can instruct inline optimizer module 430 to generate the intermediate plan. The intermediate plan can be a logical plan generated from the query, a physical plan generated from a logical plan, or a physical plan generated directly from the query. With reference to FIG. 1, the target of module 412 can be modules M1 141, M2 142, or a combination.

Module 413 can direct an execution plan to be generated for a query. In some examples, module 413 can instruct inline optimizer module 430 to generate the execution plan, but this is not a requirement, and in other examples, the execution plan can be generated offline by module 450. The input for execution plan generation can be an intermediate plan (e.g., physical or logical plan), but in some examples hub 410 can also support generation of an execution plan directly from a query. With reference to FIG. 1, the target of module 413 can be module M3 143, or a combination M2-M3 142-143 or M1-M3 141-143.

Module 414 can provide a plan data structure interface for hub 410. Execution of instructions of module 414 can cause an intermediate plan (e.g., logical or physical plan) to be received from a software module 460 of an external service. Module 414 can support multiple external services 460, such as a multi-dimensional service, a master data service, or software modules of other autonomous databases in a federated database environment. In some examples, hub 410 can act as a server for clients from such other database, and can also act as a client for another similar hub for the other database.

Module 415 can provide a storage interface within hub 410. Execution of instructions of module 415 can cause an intermediate plan to be stored into or retrieved from a plan data structure 420 in repository 419. Module 415 can also support other operations on plan data structure 420, such as: augmentation of plan data structure 420 (e.g., with an execution plan or an annotation); update to a component of plan data structure 420, e.g. when a subsequent compilation change modifies a component determined at an earlier stage; replication of a plan data structure 420 so that separate instances 420 can be maintained for logical and physical plans for a common query; or maintaining metadata, a directory, or logs of plan data structure 420. A directory can associate a given plan data structure 420 with a corresponding query. Logs can maintain timestamps and usage of plan data structure 420. Metadata can record the provenance of various components of plan data structure 420, e.g. which version of which software module generated a given component.

Module 417 can provide an execution interface for hub 410. Execution of instructions of module 417 can cause an execution plan to be executed by query execution engine 440.

Each of modules 412-414, 417 can read or write one or more components of plan data structure 420, using e.g. storage interface 415. Components of plan data structure 420 can include data sources 422, plan flow 424, annotations 426, or execution plan 428 as described elsewhere herein.

FIG. 4 illustrates additional features of the depicted software environment. Inline query optimizer 430 can be coupled to development environment 480, whereby upgrades of version changes can be made to module 430. Development environment 480 can also be used to upgrade other depicted modules, including but not limited to offline optimizer 450, execution engine 440, or modules of hub 410. Inline optimizer 430 can also be directly coupled to execution engine 440 so that an intermediate plan can be compiled to an execution plan and executed directly. Query execution engine can also return query results to hub 410, which can be conveyed back to a requesting client 470 or an external service 460 which originated an instant request for query fulfillment.

The software environment can also be coupled to database layer 490, which can be a cloud or datacenter deployment of SAP HANA®, or another database. In some examples, database layer 490 is coupled to query execution engine 440 or query optimizer 430 while, in other examples, hub 410 or other illustrated modules can also communicate with database layer 490.

Management module 470 can support control, monitoring, or administrative functions on hub 410. To illustrate, management module 470 can be hosted at a real or virtual administrator workstation, and can enable or disable various functionality of hub 410; monitor resource utilization of hub 410 or repository 419; or schedule backups or other maintenance operations.

Example Sequence Diagram

Figure 5:
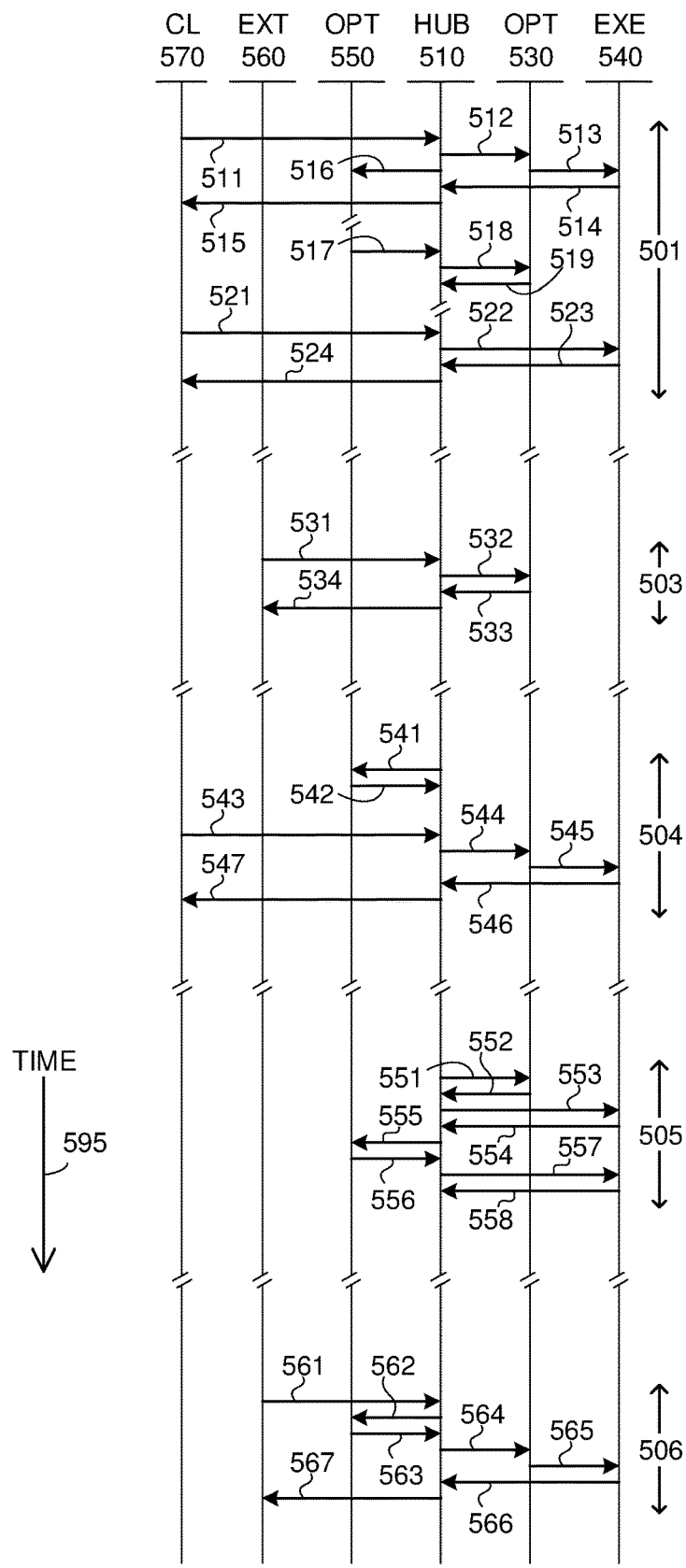
FIG. 5 is a sequence diagram depicting example use cases of the disclosed technologies.

FIG. 5 is a sequence diagram 500 depicting example use cases of the disclosed technologies. The use cases involve a hub 510 similar to hub 410 of FIG. 4 or capable of coordinating operations similar to software module M0 140 of FIG. 1. Five use cases 501, 503-506 are described and are merely illustrative, as described features can be used in myriad combinations, subcombinations, or combinations of subcombinations, or in entirely different ways as disclosed herein.

Sequence diagram 500 is shown with six actors: client 570 (identified as "CL"), external service 560 ("EXT"), optimizer 550 ("OPT," which can be an offline optimizer in some use cases), hub 510 ("HUB"), optimizer 530 ("OPT," which can be an inline optimizer in some examples), and execution engine 540 ("EXE"). In varying examples, offline optimizer 550 can determine an intermediate plan (e.g., physical plan or logical plan) from a query or from an earlier stage intermediate plan (e.g., physical plan from logical plan). In varying examples, inline optimizer can determine an intermediate plan or an execution plan from a query or from an earlier stage intermediate plan. In varying deployments or scenarios, more, fewer, or different actors can be used. For example, hub 510 can interface with additional optimizers, offline or inline, e.g. for load balancing; for testing, evaluation, or comparison of optimizers; as selected by a requesting client or service; or for selectively utilizing the strengths of certain optimizers for certain types of queries.

In sequence diagram 500, each actor has a respective timeline running downward in a direction of increasing time runs as shown by arrow 595. Breaks in time are indicated by diagonal lines across one or more of the timelines.

For clarity of illustration, hub 510 is depicted as a monolithic entity in FIG. 5. However, embodiments of hub 510 can include numerous software modules as described in context of FIG. 4, the modules being invoked in varying combinations for the various operations depicted in FIG. 5. Furthermore, details of operations involving plan data structures are not shown in FIG. 5. Generally, it can be understood that any operation involving receipt of a plan at hub 510 can involve storing one or more components of the plan in a corresponding plan data structure as described herein, and any operation involving inputting or transmitting a plan from hub 510 to another software module can involve retrieving one or more components of the plan from the corresponding plan data structure.

Use Case—Offline Optimizer

Use case 501 demonstrates use of offline optimizer 550 to supplement inline optimizer 530. Use case 501 makes use of the fact a same query is often invoked multiple times in a database environment. A first instance of a query can be optimized twice, once by inline optimizer 530 to provide a low latency response to the initial query, and once by offline optimizer 550 to provide more efficient or otherwise superior execution on a second and subsequent occurrences of the same query. Various exemplary metrics for a more efficient or superior plan can include faster execution in wall-clock time, faster execution in CPU cycles, less utilization of other CPU resources, less memory usage, less accesses to a local or remote storage device, or less cost for a cloud implementation.

The first instance of the query can be received at hub 510 from client 570 at arrow 511, at which point the method can fork. The query can be sent to optimizer 530 for inline compilation (arrow 512) to generate an execution plan which is sent directly to execution engine 540 (arrow 513) for execution. Results of execution can be returned to hub 510 (arrow 514) and forwarded to client 570 to fulfill the first query instance.

On the other branch of the fork, the query can be forwarded to optimizer 550 for offline compilation (arrow 516). This compilation stage is not time-constrained and, after some delay, an intermediate plan can be returned to hub 510 (arrow 517). The intermediate plan can be inputted to inline optimizer 530 (arrow 518) to determine an execution plan which can be returned to hub 510 (arrow 519). Subsequently, a second instance of the query can be received at hub 510 from client 570 (arrow 521). The offline optimized execution plan (from arrow 519), saved at hub 510, can be retrieved and sent to execution engine 540 (arrow 522) for execution. Arrows 523-524 show execution results being returned to hub 510 and forwarded to client 570 respectively.

Numerous variations of use case 501 can be implemented within scope of the disclosed technologies. In examples, operations 518-519 can be omitted or deferred. The intermediate plan can be sent for conversion into an execution plan only after the second query instance is received. That is, arrow 518 can occur after, and responsive to, arrow 521. Thereafter plan execution can occur mediate by hub 510, with actions similar to arrows 519, 522, or directly from optimizer 530 similar to arrow 513. In other examples, the role of client 570 can be performed by external service 560.

Use Case—External Service

Use case 503 demonstrates use of the disclosed technologies to support external services 560. A disclosed plan data structure specification can advantageously provide a stable interface between local software modules of a query processing environment and external software modules, so that effects of version changes can be compartmentalized.

At arrow 531, an intermediate plan can be received from external service 560. At arrow 532 the intermediate plan can be transmitted to optimizer 530 to determine a corresponding execution plan. The execution plan can be returned to hub 510 at arrow 533, and forwarded to the requesting service 560 at arrow 534.

In a variation, arrow 531 can provide a query to hub 531 instead of an intermediate plan. In another variation, the execution plan can be executed locally, similar to arrows 522-523, and query results can be returned to the requesting service 560 at arrow 534. In a further variation, an intermediate plan can be returned to external service 560 at arrow 534. The input at arrow 531 can be either a query or an earlier stage intermediate plan.

Use Case—Plan Cache

In some examples, a major expenditure of effort occurs in the optimizations to generate an intermediate plan, and subsequent generation of an execution plan can largely involve mapping the intermediate plan to the underlying database. In further examples, the intermediate plan can be one or more orders of magnitude more compact than the execution plan. Accordingly, hub 510 can maintain one or more intermediate plans compactly in a cache, ready for just-in-time compilation into an execution plan, followed immediately by execution. This is illustrated in use case 504.

At arrow 541, hub 510 can instruct optimizer 550 to determine an intermediate plan for an instant query. At arrow 542, the intermediate plan can be returned to hub 510 to be cached for future instances of the same query. Subsequently, another instance of the same query can be received from client 570 at arrow 543. Responsively, the cached plan from arrow 542 can be transmitted to optimizer 530 for generation of an execution plan, which can be sent to execution engine 540 at arrow 545 for execution. The results can be returned to hub 510 at arrow 546 and forwarded to requesting client at arrow 570.

A similar caching technique can be used for queries or intermediate plans received from external service 560.

Use Case—Plan Historization

It can be desirable to preserve optimizations in an intermediate plan across version changes in an optimizer. Maintenance of plan optimization is dubbed "plan historization," which can also be described with reference to use case 504. Particularly, an intermediate plan received at arrow 542 can be retained as an archival plan data structure. Then, if a version change of optimizer 530 occurs between arrows 542 and 543, the query can be handled using the archived plan data structure and the optimizations embodied therein. While arrows 541, 542 depict intermediate plan generation by optimizer 550 (which can be an offline optimizer), the technique is also applicable to intermediate plans or execution plans generated by an inline optimizer 530.

Use Case—Multiple Optimization Engines

The disclosed technologies allow engines for one or more compilation stages to be readily swapped in or out, sharing a common representation of a plan data structure. This is illustrated in use case 505.

An intermediate plan can be send to first optimization engine 530 at arrow 551 for generation of a first execution plan, which is returned to hub 510 at arrow 552. The first execution plan is sent for execution at arrow 553, and first results are returned to hub 510 at arrow 554.

At arrows 555-558, similar operations are repeated with second optimization engine 550. Optimization engine 550 receives the same intermediate plan at arrow 555 and returns a second execution plan to hub 510 at arrow 556. Optimization engines 530, 550 can implement different optimization technologies, and use case 505 can be applied for purpose of test, comparison, or validation of new or evolving optimization technology. Alternatively, use of the first and second optimization engines can be spread out in time, reflecting version changes in an optimizer.

This use case demonstrates separation of plan representation (e.g., in a plan data structure) from optimization technology.

Use Case—Successive Intermediate Plans

Use case 506 demonstrates staged compilation with multiple intermediate plans. At arrow 561, a first intermediate plan can be received at hub 510 from external service 560. The first intermediate plan can be retransmitted to optimizer 550 at arrow 562, to generate a corresponding second intermediate plan which can be returned to hub 510 at arrow 563. The second intermediate plan can be retransmitted to optimizer 530 at arrow 564 to generate an execution plan, which can be input to execution engine 540 at arrow 565. Execution results can be returned to hub 510 at arrow 566, and forwarded to external service 560 at arrow 567.

Example Plan Data Structure Specification

FIGS. 6A-6E are diagrams 601-605 of an example plan data structure specification according to the disclosed technologies. Diagram 601 depicts a top level specification of a disclosed plan data structure, and diagrams 602-605 depict deeper structure of respective top-level attributes. An instance of the plan data structure specification is a plan data structure. The attributes shown in diagrams 601-605 are instantiated as respective fields of the data structure.

Figures 6A, 6B:
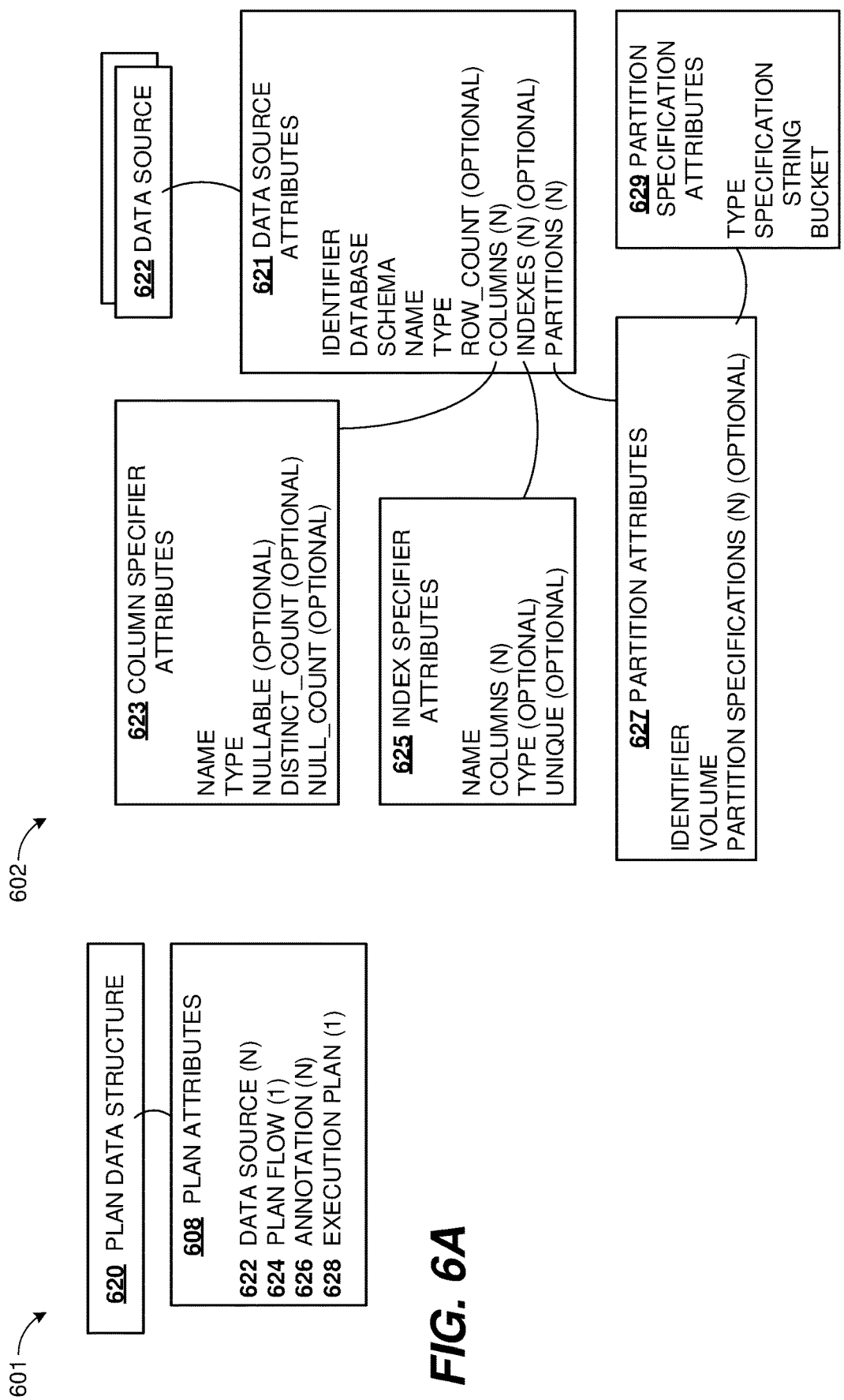

Starting with FIG. 6A, diagram 601 depicts the plan attributes 608 of plan data structure 620. The curved connectors in diagrams 601-605 are directional, from within the outline of a parent level (and generally, proximate to a particular field at the parent level) and ending on the outline of the child level attributes (of that particular field). Thus, box 608 depicts the attributes of the root attribute 620 corresponding to the entire plan data structure. The attributes 608 are the top-level attributes of plan data structure 620, and include attributes 622 (data source), 624 (plan flow), 626 (annotation), and 628 (execution plan). For clarity of illustration, each attribute listed in 608 is designated (N) or (1), indicating the cardinality of the field(s) corresponding to that attribute in an instantiated plan data structure. Thus, the (N) designation indicates that a plan data structure can have one or a plurality of data source fields and one or a plurality of annotation fields. The (1) designation indicates that a plan data structure according to this example can be limited to just one plan flow field, and just one execution plan field. A logical plan can be written to a plan data structure despite having no annotations. In such cases, an annotation field can be absent, undefined, empty, or defined with a null value. The execution plan attribute 628 is optional, and can be included in some embodiments of the disclosed technologies but excluded from other embodiments.

As the name suggests, data source fields can define inputs to an instant query. To illustrate, a data source can be a database named "PS1" (see, FIG. 8B described further herein). A plan flow field defines one or more operators applied to fulfill the query. To illustrate, a plan flow operator can be an "inner join" (see, FIG. 8D). An operator can act on a data source or on a result of a prior operator. Annotation fields can define hints, e.g. providing guidance on physical algorithms used to implement one or more operators. To illustrate, a global hint can be "NO_USE_OLAP_JOIN" indicating that joins can preferably use join techniques other than OLAP, while a scoped hint can indicate that join cardinality of operator 8 (an inner join) is "1 ... n" (see, FIG. 8G). Such a hint can apply specifically and only to operator 8 as it is defined, and not to other operators such as the inner join at operator 12. An execution plan field can define an execution plan (see, FIG. 7E).

Turning to FIG. 6B, diagram 602 depicts details of top-level data source attribute 622. The attributes 621 of data source 622 include an identifier (e.g., 1, 2, see FIG. 8B), a database (e.g., "PS1"), a schema (e.g., "SYSTEM") associated with the data source, a name (e.g., "part", being the name of a component within database PS1), and a type (e.g., "ROW_TABLE" indicating that table "part" is a row store table); optional row count (e.g., 75, indicating that table "part" has 75 rows); as well as attributes columns, optional indexes, and partitions, each of which can have further structure. A data source can have one or more columns, one or more partitions, and (if present) one or more indexes, as indicated by the (N) alongside each of these attributes in data source attributes 621. The other attributes can be instantiated with a single field for each.

At a next level, a column has column specifier attributes 623 including name (e.g., "p_partkey", identifying a column of the "part" table, see FIG. 8B) and type (e.g., "INTEGER" indicating that the values of the p_partkey column have integer datatype). Additionally, column specifier attributes 623 can include optional attributes nullable (Boolean, indicating whether the column can have null values), distinct_count (indicating the number of distinct values in the column; to illustrate a column "blood_type" can have a distinct count of 4, for {"O" "A" "B" "AB"} according to ABO blood typing), and null_count (indicating the number of rows having null value in the instant column). The optional attributes can be included for some columns and excluded from others. Additionally, some deployments can omit support for one or more optional attributes altogether.

Also at the next level, an index has index specifier attributes 625 including name (e.g., "#part_p_partkey" indicating the name of an index corresponding to the p_partkey column of the part table, see FIG. 8B), a column listing one or more columns in the index (e.g., "p_partkey" indicating that p_partkey is the sole column of the instant index), a type (e.g., "BTREE" indicating that the instant index is organized as a self-balancing B-tree data structure), and a unique (Boolean) flag. As shown, the type and unique attributes are optional.

Similarly, a partition attribute of the data source attributes 621 can have a deeper structure of partition attributes 627, including an identifier (e.g., 1, see FIG. 8B) and a volume (e.g., 1) which identify a given partition in the part table by identifier and volume on which that partition is stored. A partition can optionally have one or more partition specifications. The partition specification in turn can have partition specification attributes 629 including a type (string), a specification string (string), and a bucket (integer). In some examples, partitions can be determined based on usage, e.g. most-recently-used (or, hot storage tier) to least-recently-used (or, cool storage tier).

Turning to FIG. 6C, plan flow 624 can have plan flow attributes 641 including an root operator identifier and a list of one or more operators. Each operator in turn can have operator attributes 643 including a root identifier (e.g., 8, see FIG. 8D), a name (e.g., "inner join"), a list of sources (e.g., [1] indicating that the source for this operator is the data source 1 itself, or [6, 7] indicating that the sources for another operator have identifiers 6, 7 which are both earlier operators of an instant plan flow), and a list of columns (e.g., [0][1] indicating column 1 of the source with index 0 in the sources attribute, namely operator 6; or [1][2] indicating column 2 of the source with index 1, in this case operator 7). Additionally, operator attributes 643 can include optional attributes filter (e.g., "[0] [0]=1 AND [0] [3] LIKE '% TEST %'", defining a filter to be applied to the instant operator in terms of the [source] [column] notation), limit (e.g., 80, defining a maximum number of records to be returned), offset (e.g., 400, indicating to skip 400 records and start with record 401), and subqueries, which has further structure. Further, the operator attributes can include name-specific attributes (e.g., "join": "[0][0]=[1][0]", indicating that the inner join is to be performed between column 0 of source id 6 (index 0 in the sources attribute) and column 0 of source id 7), and operation (e.g., "grouping" for a GROUP_BY operator, see FIG. 7C). The operation can have operation attributes 647 which can be a parameter list specific to the instant operation.

In some scenarios, queries can be broken down into subqueries, producing reusable stored intermediate results. A subquery can have subquery attributes 645 including root (identifying a root node of a target subquery) and a parameter list. Both scalar subqueries and correlated subqueries can be supported. A scalar subquery can be evaluated once in common for all data records, while the result of a correlated subquery is dependent on other data of an instant record. Extensions of the column notation, such as "$[m] [n]", "[ ][n]", or ":[ ][n]", can be used to designate subquery columns, materialization expressions, or correlation variables respectively.

Turning to FIG. 6D, annotation 626 can have annotation attributes 661 including an identifier (e.g., 8, see FIG. 8G), indicating that this annotation is scoped to operator with id 8) and one or name specific attributes (e.g., "join_cardinality": "1 . . . n").

Lastly, turning to FIG. 6E, execution plan 628 can have execution plan attributes 681 including a type (e.g., 3, see FIG. 7E, indicating that Base-64 encoding of this execution plan) and the serialized plan itself.

Example Plan Data Structures

FIGS. 7A-7E are diagrams 701-705 of a first query and an associated example plan data structure. FIG. 7A shows an SQL query 715 to which the disclosed technologies can be applied. FIG. 7B shows a corresponding data source 722. In this example, there is a single data source having identifier ("id") of 1. FIG. 7C shows a corresponding plan flow 724 having three operators with id's 2-5. Plan flow 724 has root id of 5, indicating that operator id 5 provides the query result. Examination of FIGS. 7A-7C demonstrates that the logical plan of FIGS. 7B-7C correctly implements query 715. FIG. 7D shows two annotation fields 726, one ("hints") being global, and the other ("selectivities") scoped to operator id 3. Fields 722, 724, 726 can be part of an intermediate plan for query 715, as described herein. Finally, FIG. 7E shows an execution plan of type 3 (indicating base-64 encoding) and including the serialized plan ("bz9 . . . "). Fields 722, 724, 726 are shown in a JSON format, however this is not a requirement, and other standard or proprietary representations can also be used.

FIGS. 8A-8G are diagrams 801-807 of a second query and an associated example plan data structure. FIG. 8A shows an SQL query 815 to which the disclosed technologies can be applied. FIGS. 8B-8C show data sources fields 822 which can be part of an intermediate plan for query 815. In this example, there are five data sources having id's 1-5. FIGS. 8D-8F show a corresponding plan flow 824 having 20 operators with id's 6-25 and a root id of 25. FIG. 8G shows two annotation fields 826. Fields 822, 824, 826 can be part of an intermediate plan for query 815, as described herein. In this example, a field for an execution plan is omitted from the specification of the plan data structure.

FIGS. 9A-9B are diagrams 901-902 showing a third query and an associated plan flow. FIG. 9A shows an SQL query 915 for a Select function, and FIG. 9B shows a corresponding plan flow 924. The plan flow has three operators with id's 3, 4, 5, and a root id of 5. Other plan data structure fields are omitted from this example.

FIGS. 10A-10B are diagrams 1001-1002 showing a fourth query and an associated plan flow. FIG. 10A shows an SQL query 1015 for selecting top 10 rows of a specified union, and FIG. 10B shows a corresponding plan flow 1024. The plan flow has four operators with id's 3-6, and a root id of 6. Other plan data structure fields are omitted from this example. As for FIG. 7, the intermediate plans of FIGS. 8-10 match their respective queries.

A Generalized Computer Environment

Figure 11:
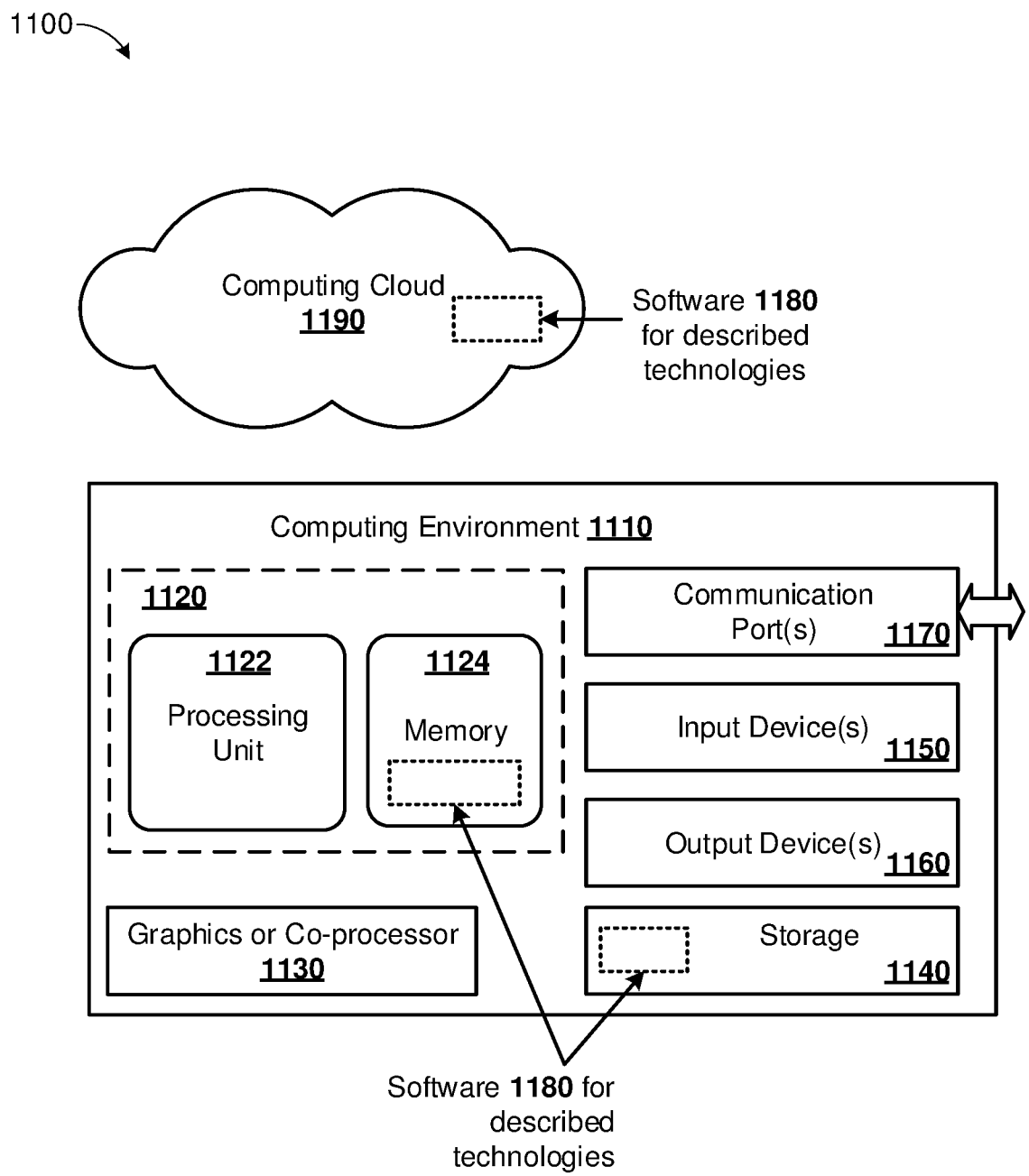
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of software for query compilation or management of plan data structures can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for performing one or more stages of query compilation, other query fulfillment operations, or reading, writing, or managing plan data structures, or various other architectures, software components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store plan data structures, associated metadata, logs, or directories; other configuration data, data structures including data tables, working tables, change logs, output structures, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the hardware components of the computing environment 1110. Typically, operating system software (not shown) provides an operating environment for other software executing in the computing environment 1110, and coordinates activities of the hardware and software components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technologies are executed. Any combination of memory 1124, storage 1140, and computing cloud 1190 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
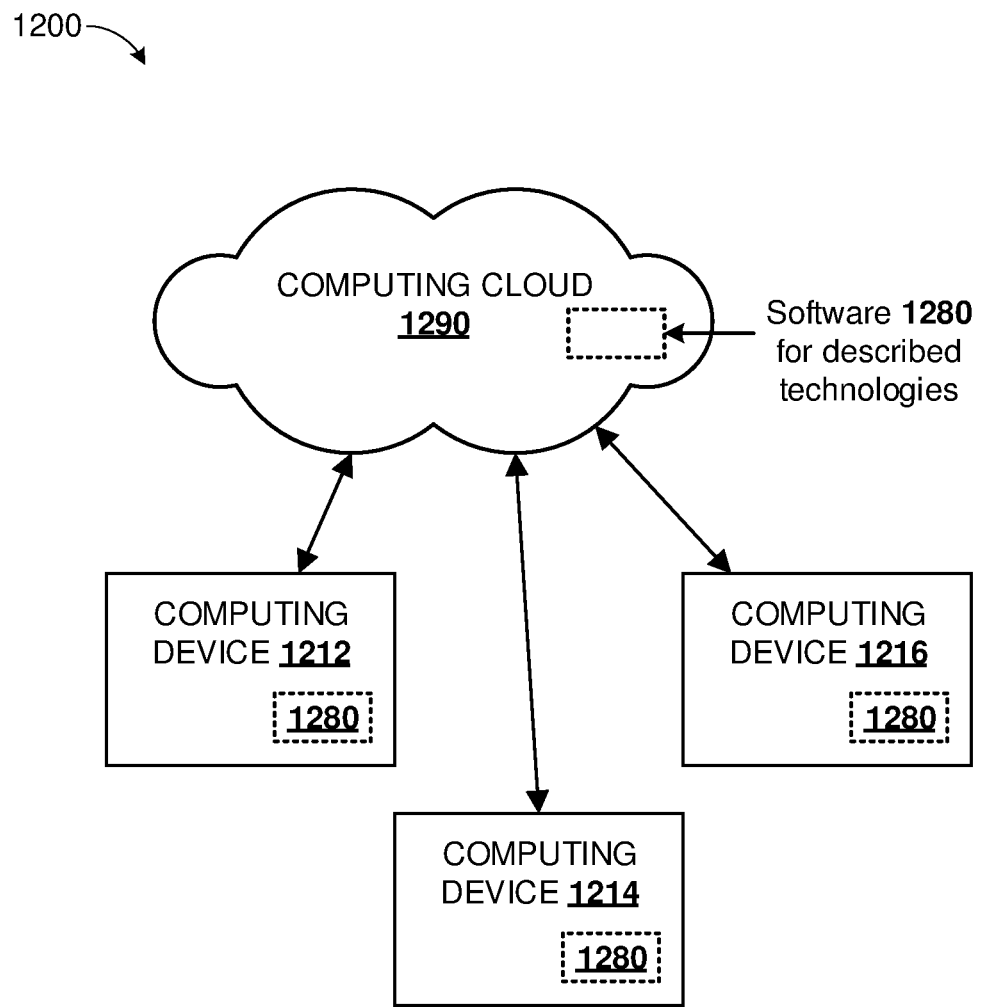
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add," "augment," "call," "combine," "compile," "compute," "configure," "control," "convey," "determine," "evaluate," "execute," "forward," "generate," "instruct," "modify," "notify," "obtain," "output," "perform," "read," "receive," "request," "respond," "return," "retrieve," "select," "send," "serve," "set," "store," "transmit," "update," "use," or "write," to indicate computer operations in a computer system. These terms denote actual operations that are performed or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, values, procedures, or apparatus may be referred to as "optimal," "lowest", "best", "maximum," "extremum," or the like. It will be appreciated that such descriptions are intended to indicate that a selection among a few or among many alternatives can be made, and such selections need not be lower, better, less, or otherwise preferable to other alternatives not considered.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The terms computer-readable media or computer-readable storage media do not include signals and carrier waves. In addition, the terms computer-readable media or computer-readable storage media do not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for compiling a query, wherein the query is a declarative database query, the method comprising:
performing query compilation operations comprising:
receiving a physical plan for the query from a first software module, the physical plan comprising one or more data sources, a plan flow, and one or more annotations (which are metadata for guiding downstream compilation or execution stages) stored as respective fields of a plan data structure; and
instructing a second software module to determine an execution plan for the physical plan; and
outputting the execution plan for execution by an execution engine to obtain results for the query.

2. The computer-implemented method of claim 1, wherein the first software module is an offline query optimizer and the method further comprises, prior to the receiving:
instructing the offline query optimizer to determine the physical plan for the query.

3. The computer-implemented method of claim 2, wherein the instructing the offline query optimizer is performed responsive to a first instance of the query being received from a first client, and the method further comprises:
causing the execution plan to be executed responsive to a subsequent instance of the query being received from a second client.

4. The computer-implemented method of claim 1, wherein a specification for the plan data structure comprises an optional field for an execution plan, and wherein the method further comprises:
augmenting the plan data structure with the execution plan in the optional field.

5. The computer-implemented method of claim 4, further comprising:
causing the first software module to execute the execution plan from the augmented plan data structure.

6. The computer-implemented method of claim 1, wherein the execution plan is a first execution plan, and the method further comprises:
subsequent to a version change of the second software module into a third software module, instructing the third software module to determine a second execution plan for the physical plan;
wherein the version change causes the second execution plan to be different from the first execution plan.

7. The computer-implemented method of claim 1, wherein the one or more annotations comprise a scoped hint (which is applicable to some but not all operations of the plan flow) to the second software module.

8. The computer-implemented method of claim 1, further comprising:
instructing a third software module to execute the execution plan to obtain results for the query; and
forwarding the results to the first software module.

9. A system for query compilation comprising:
one or more hardware processors, with memory coupled thereto; and
computer-readable media storing program instructions executable by the one or more hardware processors, the program instructions comprising:
first instructions which, when executed, cause a logical plan for a database query to be received from a first software module; and
second instructions which, when executed, cause a second software module to determine a physical plan for the logical plan;
wherein the logical plan and the physical plan each comprise one or more data sources and a plan flow stored according to a common data structure specification, the physical plan further comprising one or more annotations (which are metadata for guiding downstream compilation or execution stages) also stored according to the common data structure specification.

10. The system of claim 9, wherein the second software module comprises an inline query optimizer.

11. The system of claim 9, wherein the common data structure specification remains invariant over a version change of the second software module.

12. The system of claim 9, wherein the database query is an SQL query.

13. The system of claim 9, wherein the first software module is at least part of an implementation of a multi-dimensional service.

14. The system of claim 9, wherein the logical plan is stored in a first data structure according to the common data structure specification and the second instructions, when executed, further cause the one or more annotations to be added to the first data structure.

15. The system of claim 9, wherein the instructions further comprise:
third instructions which, when executed, cause a third software module to determine an execution plan for the physical plan and augment the stored physical plan with the execution plan.

16. One or more computer-readable media storing program instructions for query compilation, executable by one or more hardware processors, the program instructions comprising:
first instructions which, upon execution, cause receipt of a query which is a declarative database query;
second instructions which, upon execution, instruct a first software module to determine a first intermediate plan for the query;
third instructions which, upon execution, instruct a second software module to determine an execution plan for a second intermediate plan;
fourth instructions which, upon execution, cause a third intermediate plan to be received from a third software module; and
fifth instructions which, upon execution, cause a fourth intermediate plan to be stored or retrieved;
wherein each intermediate plan of the first, second, third, and fourth intermediate plans comprise one or more data sources and a plan flow, the each intermediate plan organized as a serialized data structure conforming to a common data structure specification providing a field for the plan flow and additional one or more fields for the one or more data sources;
wherein the common data structure specification further provides, for a case in which a given plan of the first, second, third, or fourth intermediate plans comprises one or more annotations, one or more additional fields for the one or more annotations; and
wherein the annotations are metadata for guiding downstream compilation or execution stages.

17. The one or more computer-readable media of claim 16, wherein the executable instructions further comprise:
- sixth instructions which, upon execution, cause the second intermediate plan to be augmented with the execution plan; and
- seventh instruction which, upon execution, cause the execution plan to be executed by a fourth software module.

18. The one or more computer-readable media of claim 16, wherein the fourth instructions, in respective cases, cause respective intermediate plans to be received from each of a plurality of software modules including the third software module.

19. The one or more computer-readable media of claim 16, wherein the first software module is an offline query optimizer, the second software module comprises an inline query optimizer, and the third software module is at least part of an implementation of a multi-dimensional service.

20. The one or more computer-readable media of claim 16, wherein the executable instructions further comprise:
- sixth instructions which, upon execution, cause a sixth intermediate plan to be determined for a fifth intermediate plan;
- wherein the sixth intermediate plan, including one or more annotations of the sixth intermediate plan, and the fifth intermediate plan are stored according to the common data structure specification.

* * * * *